(12) United States Patent
Jin et al.

(10) Patent No.: US 11,698,696 B1
(45) Date of Patent: Jul. 11, 2023

(54) TOUCH DISPLAY PANEL AND TOUCH DISPLAY DEVICE

(71) Applicant: Shanghai AVIC Optoelectronics Co., Ltd., Shanghai (CN)

(72) Inventors: Huijun Jin, Shanghai (CN); Dandan Qin, Shanghai (CN)

(73) Assignee: SHANGHAI AVIC OPTOELECTRONICS CO., LTD., Shanghai (CN)

(*) Notice: Subject to any disclaimer, the term of this patent is extended or adjusted under 35 U.S.C. 154(b) by 0 days.

(21) Appl. No.: 17/948,266

(22) Filed: Sep. 20, 2022

(30) Foreign Application Priority Data

Jun. 28, 2022 (CN) .......................... 202210742458.9

(51) Int. Cl.
  *G06F 3/041* (2006.01)
(52) U.S. Cl.
  CPC ................ *G06F 3/04164* (2019.05)
(58) Field of Classification Search
  CPC .................................................. G06F 3/04164
  USPC ...................................................... 345/173
  See application file for complete search history.

(56) References Cited

U.S. PATENT DOCUMENTS

| | | | |
|---|---|---|---|
| 2016/0188063 A1* | 6/2016 | Kim | G06F 3/0412 345/173 |
| 2019/0072798 A1* | 3/2019 | Aichi | H01L 27/124 |
| 2021/0041733 A1* | 2/2021 | Ai | G02F 1/136209 |
| 2021/0263606 A1* | 8/2021 | Lee | H01Q 1/44 |
| 2022/0236820 A1* | 7/2022 | Asada | G06F 3/0443 |
| 2022/0300115 A1* | 9/2022 | Li | G06F 3/0412 |

FOREIGN PATENT DOCUMENTS

| | | | | |
|---|---|---|---|---|
| CN | 106896961 A | * | 6/2017 | ......... G02F 1/13338 |
| CN | 106066740 B | | 2/2019 | |
| CN | 209044559 U | | 6/2019 | |
| CN | 108110010 B | | 10/2021 | |

* cited by examiner

*Primary Examiner* — Mark Edwards
(74) *Attorney, Agent, or Firm* — East IP P.C.

(57) ABSTRACT

A touch display panel and a touch display device. The touch display panel includes a first display area, a second display area and a binding area arranged along a first direction, and a touch bonding pad is arranged in the binding area and is configured to input touch driving signals; a plurality of touch electrodes are arranged in each of the first display area and the second display area; the touch display panel further includes a plurality of touch signal lines extending along the first direction and arranged at intervals along a second direction, the touch bonding pad is electrically connected to the touch electrodes by the touch signal lines; and touch signal lines electrically connected to the touch electrodes in the first display area are first touch signal lines, touch signal lines electrically connected to the touch electrodes in the second display area are second touch signal lines.

16 Claims, 17 Drawing Sheets

TOUCH DISPLAY PANEL AND TOUCH DISPLAY DEVICE

CROSS-REFERENCE TO RELATED APPLICATION

This application claims priority to Chinese Patent Application No. 202210742458.9, filed on Jun. 28, 2022, which is hereby incorporated by reference in its entirety.

TECHNICAL FIELD

The present application relates to the field of display technology, and particularly relates to a touch display panel and a touch display device.

BACKGROUND

With the development of touch technology, touch display devices are getting more and more popular among people. A user can directly operate the devices with a finger or a stylus, thus the utilization is convenient and comfortable. An existing touch display device includes a plurality of touch electrodes, touch wires electrically connected to the touch electrodes in a one-to-one correspondence, and a touch chip electrically connected to the touch wires. The touch lines are configured to transmit touch scan signals sent by the touch chip.

However, as a size of the touch display device increases, the number of the touch wires increases and an aperture ratio of the touch display device decreases.

SUMMARY

Embodiments of the present application provide a touch display panel and a touch display device, which can increase an aperture ratio of the touch display panel and an aperture ratio of the touch display device.

In a first aspect, embodiments of the present application provide a touch display panel. The touch display panel comprises a first display area, a second display area and a binding area arranged along a first direction, and a touch bonding pad is arranged in the binding area and is configured to input touch driving signals; a plurality of touch electrodes are arranged in each of the first display area and the second display area; the touch display panel further comprises a plurality of touch signal lines extending along the first direction and arranged at intervals along a second direction, the touch bonding pad is electrically connected to the touch electrodes by the touch signal lines, and the first direction intersects the second direction; and touch signal lines electrically connected to the touch electrodes in the first display area are first touch signal lines, touch signal lines electrically connected to the touch electrodes in the second display area are second touch signal lines, and a minimum width of each of the second touch signal lines along the second direction is less than a minimum width of each of the first touch signal lines along the second direction.

In a second aspect, embodiments of the present application provide a touch display device including the touch display panel provided in the first aspect.

The touch display panel and the touch display device of embodiments of the present application are divided into the first display area and the second display area based on distances from the binding area (the first display area being away from the binding area and the second display area being close to the binding area), where the touch signal lines electrically connected to the touch electrodes in the first display area are the first touch signal lines and the touch signal lines electrically connected to the touch electrodes in the second display area are the second touch signal lines, and the width of the second touch signal line is less than the width of the first touch signal line. That is, the thin second touch signal lines are used for the touch electrodes in the second display area (or the width of the second touch signal line is reduced).

BRIEF DESCRIPTION OF THE DRAWINGS

In order to illustrate technical solutions of embodiments of the present application more clearly, the drawings required for the embodiments of the present application will be briefly described. For a person skilled in the art, other drawings can also be obtained from these drawings without any inventive effort.

DETAILED DESCRIPTION

Figure 1:
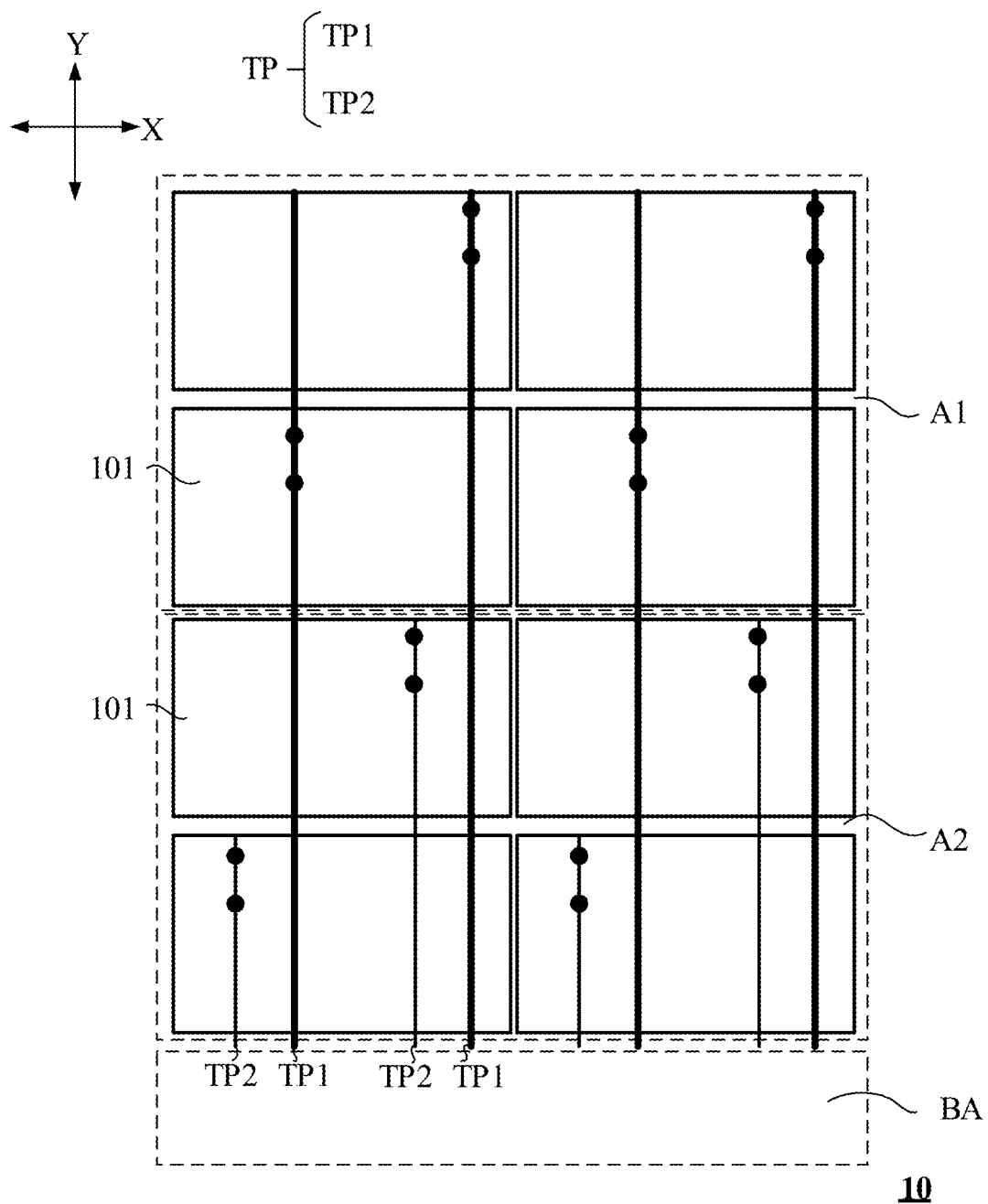
FIG. 1 is a schematic structural view of a touch display panel according to an embodiment of the present application.

Features and exemplary embodiments of various aspects of the present application will be described in detail below. In order to make the objects, technical solutions and advantages of the present application clearer, the present application is further described in detail below with reference to the drawings and specific embodiments. It should be understood that, specific embodiments described herein are merely for the illustration of the present application, not for limiting the present application. For those skilled in the art, the present application may be implemented without some of these specific details. The following description of the embodiments is only for providing a better understanding of the present application by illustrating examples of the present application.

It should be noted that, herein, relational terms such as "first" and "second" are used only for distinguishing one entity or operation from another entity or operation, and do not necessarily require or imply any such actual relationship or order between these entities or operations. Moreover, the terms "comprising", "including", or any other variation thereof, are intended to encompass a non-exclusive inclusion, such that a process, a method, an article or a device including a series of elements not only includes these elements, but also includes other elements not explicitly listed, or includes elements inherent to the process, the method, the article or the device. Without further limitation, an element preceded by "including . . . " does not exclude presence of additional similar elements in a process, a method, an article or a device including the element.

It should be understood that, the term "and/or" used herein refers to only an association relationship for describing associated objects, which includes three possible kinds of relationships. For example, "A and/or B" may represent three possible cases including "A existing alone", "A and B existing simultaneously", and "B existing alone". In addition, the character "/" herein generally represents that there is an "or" relationship between the associated objects preceding and succeeding the character "/" respectively.

In the embodiments of the present application, the term "electrical connection" may refer to a direct electrical connection between two components, or may refer to an electrical connection between two components via one or more other components.

It will be apparent to those skilled in the art that various modifications and variations can be made to the present application without departing from the gist or scope of the present application. Accordingly, the present application is intended to cover the modifications and variations of the present application that fall within the scope of the appended claims (claimed technical solutions) and their equivalents. It should be noted that, the implementations provided by the embodiments of the present application may be combined with one another without conflict.

Before describing the technical solutions provided by the embodiments of the present application, in order to facilitate the understanding of the embodiments of the present application, the present application first specifically describes the problems existing in the related art.

For a larger size of a display screen and beauty of appearance of a touch display panel, increasing a display size and a resolution of the touch display panel has become one of main research and development directions for those skilled in the related art, so that a size of the touch display panel is increasing. However, as the size of the touch display panel increases, the number of touch electrodes also increases. Correspondingly, the number of touch wires connected to the touch electrodes will also increase, which decreases an aperture ratio of the touch display panel.

In view of the above findings of the inventors, embodiments of the present application provide a touch display panel and a touch display device, which can solve the technical problem of the low aperture ratio of the touch display panel in the related art.

Technical concept of the embodiments of the present application is that, the touch display panel and the touch display device are divided into a first display area and a second display area based on distances from a binding area (the first display area being away from the binding area and the second display area being close to the binding area), where touch signal lines electrically connected to touch electrodes in the first display area are first touch signal lines and touch signal lines electrically connected to touch electrodes in the second display area are second touch signal lines, and a width of the second touch signal line is less than a width of the first touch signal line. That is, the thin second touch signal lines are used for the touch electrodes in the second display area (or the width of the second touch signal line is reduced), so that shielding of light by the second touch signal lines is mitigated and the aperture ratio of the touch display panel and the aperture ratio of the touch display device are increased. In addition, the thick first touch signal lines are used for the touch electrodes in the first display area, which can ensure that the first touch signal lines which are relatively long have small impedances and thus the touch electrodes in the first display area have desired touch sensitivity.

The touch display panel of the embodiments of the present application is first described below.

FIG. 1 is a schematic structural view of a touch display panel according to an embodiment of the present application. As shown in FIG. 1, a touch display panel 10 according to an embodiment of the present application may include a first display area A1, a second display area A2 and a binding area BA arranged in sequence along a first direction Y. A touch bonding pad (not shown in the figure) is arranged in the binding area BA and is configured to input touch driving signals. For example, in actual practice, the touch bonding pad may be electrically connected to a flexible printed circuit (FPC) or a touch chip and may be configured to receive touch driving signals sent by a touch chip.

A plurality of touch electrodes 101 may be arranged in each of the first display area A1 and the second display area A2. The plurality of touch electrodes 101 may be arranged at intervals and insulated from one another. The touch display panel 10 may further include a plurality of touch signal lines TP extending along the first direction Y and arranged at intervals along a second direction X. The touch bonding pad may be electrically connected to the touch electrodes 101 via the touch signal lines TP The first direction Y intersects the second direction X. It will be readily understood that, each of the first direction Y and the second direction X may be parallel to a plane where the touch display panel is positioned. In an example, the first direction Y may be a column direction of the touch display panel, and the second direction X may be a row direction of the touch display panel.

For ease of illustration, touch signal lines TP electrically connected to the touch electrodes 101 in the first display area A1 may be referred to as first touch signal lines TP1, and touch signal lines TP electrically connected to the touch electrodes 101 in the second display area A2 may be referred to as second touch signal lines TP2. In an embodiment of the present application, a width of the second touch signal line TP2 is less than a width of the first touch signal line TP1. The width is a minimum distance along the second direction X (i.e., the perpendicular distance or the linear distance). That is, a line width of the second touch signal line TP2 is less than a line width of the first touch signal line TP1.

As such, the thin second touch signal lines TP2 are used for the touch electrodes 101 in the second display area A2 (or the width of the second touch signal line TP2 is reduced), so that the shielding of light by the second touch signal lines TP2 is mitigated, so that touch performance is ensured and the aperture ratio of the touch display panel is increased at the same time.

In addition, compared to the second touch signal line TP2, the first touch signal line TP1 is longer. The longer the wire is, the higher the impedance is, so the thick first touch signal lines TP1 are still used for the touch electrodes 101 in the first display area A1. For example, the width of the first touch signal line TP1 is kept unchanged, or the width of the first touch signal line TP1 is appropriately increased with a desired aperture ratio being ensured, so that an area of a cross section of the first touch signal line TP1 is relatively large, which ensures a relatively small impedance of the long first touch signal line TP1, which ensures that the touch electrodes 101 in the first display area Al have desired touch sensitivity.

It should be noted that, the division of the display area of the touch display panel into the first display area A1 and the second display area A2 in embodiments of the present application is merely for ease of illustration. In actual practice, the first display area Al and the second display area A2 both belong to the display area of the touch display panel. The difference between the first display area A1 and the second display area A2 may only lie in that, the first display area A1 is an area of the touch display panel that is away from the binding area (or the touch chip), and the second display area A2 is an area of the touch display panel that is close to the binding area (or the touch chip). The boundary between the first display area A1 and the second display area A2 may be non-obvious.

In addition, a ratio of an area of the first display area A1 to an area of the second display area A2 is not limited in the embodiments of the present application. For example, the ratio of the area of the first display area A1 to the area of the second display area A2 may be 1:1, 1:2, 2:1 or other ratio values. As shown in FIG. 1, for example, the width of the first display area Al may be equal to the width of the second display area A2, and a ratio of a length L1 of the first display area Al to a length L2 of the second display area A2 may be 1:1, 1:2, 2:1 or any other ratio values, which can be flexibly adjusted according to the actual situations. The length is a minimum distance along the first direction Y (i.e., the perpendicular distance or the linear distance).

The arrangement of the first touch signal lines TP1 and the second touch signal lines TP2 is not limited in the embodiments of the present application. As shown in FIG. 1, for example, along the second direction X, the first touch signal lines TP1 and the second touch signal lines TP2 may be arranged alternately, that is, one second touch signal line TP2 is arranged every other first touch signal line TP1 and one first touch signal line TP1 is arranged every other second touch signal line TP2.

Figure 2:
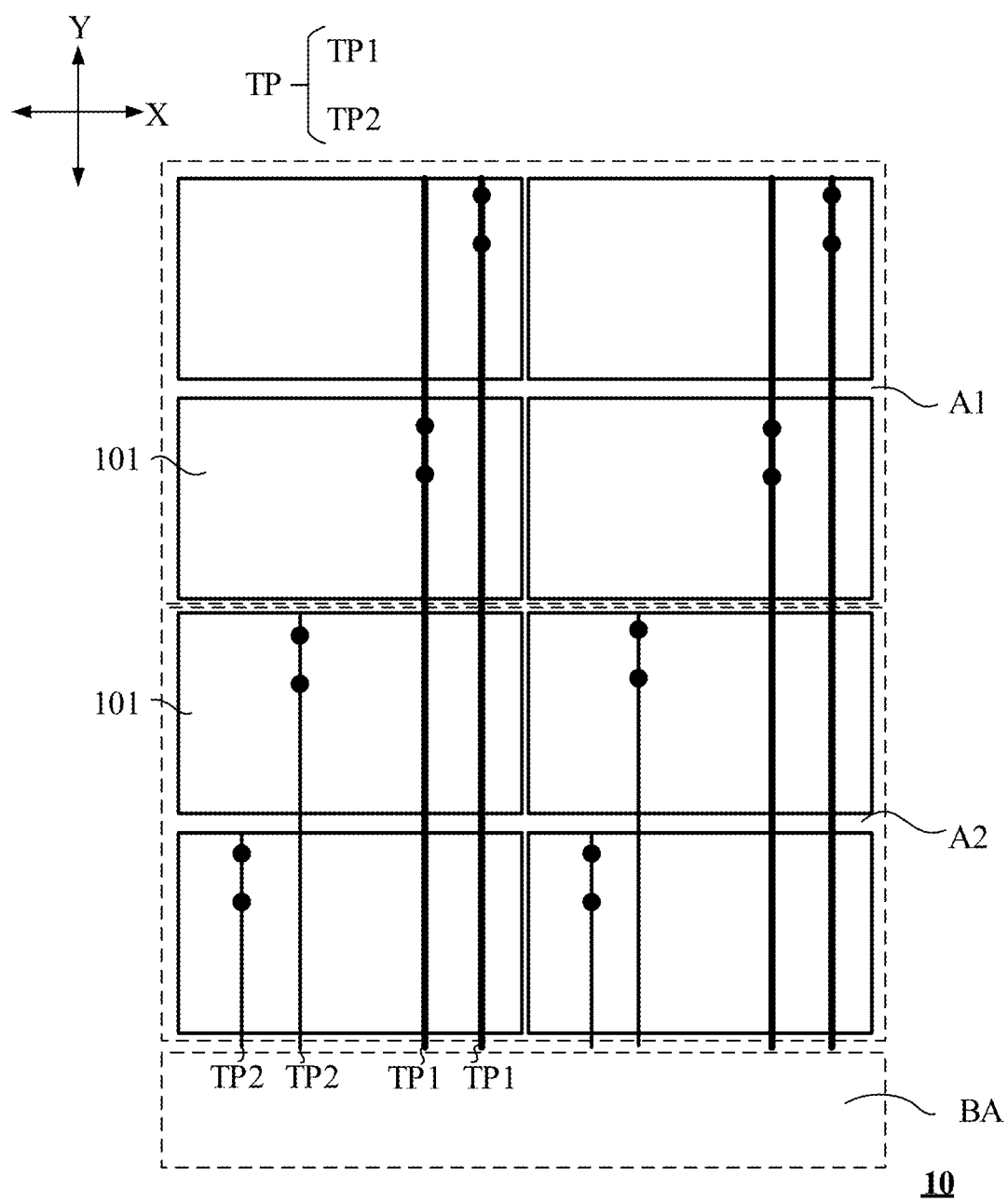
FIG. 2 is another schematic structural view of a touch display panel according to an embodiment of the present application.

FIG. 2 is another schematic structural view of a touch display panel according to an embodiment of the present application. As shown in FIG. 2, in some other embodiments, for example, along the second direction X, multiple second touch signal lines TP2 may be arranged every other multiple first touch signal lines TP1, and multiple first touch signal lines TP1 may be arranged every other multiple second touch signal lines TP2, which is not limited in the embodiments of the present application.

Through further research, the Inventors of the present application have found that, as the size of the touch display panel increases, the number of touch electrodes in the touch display panel increases. It is assumed that a size of the touch display panel A is greater than a size of the touch display panel B, for example, a height of the touch display panel A is greater than a height of the touch display panel B. In the case where the number of pixel columns corresponding to one column of touch electrodes in touch display panel A is a same as the number of pixel columns corresponding to one column of touch electrodes in touch display panel B (for example, one column of touch electrodes corresponds to 40 columns of pixels), according to a current manner in which one column of pixels is connected to one touch electrode by one touch signal line, a maximum of 40 touch electrodes can be arranged in one column of touch electrodes. As the size of the touch display panel increases, the number of touch electrodes in one column of touch electrodes needs to exceed 40, so the current wiring manner of the touch signal lines cannot meet needs of the touch display panel with a great size.

In addition, through further research, the Inventors of the present application have found that, in the case where the touch signal lines connected to two adjacent touch electrodes are close, the touch signal lines connected to the two adjacent touch electrodes are coupled with a same data signal line when the two adjacent touch electrodes are touched, which increases crosstalk of the data signal lines and affects display quality.

In view of the above findings, an embodiment of the present application proposes an arrangement of the first touch signal lines TP1 and the second touch signal lines TP2 as described below.

Figure 3:
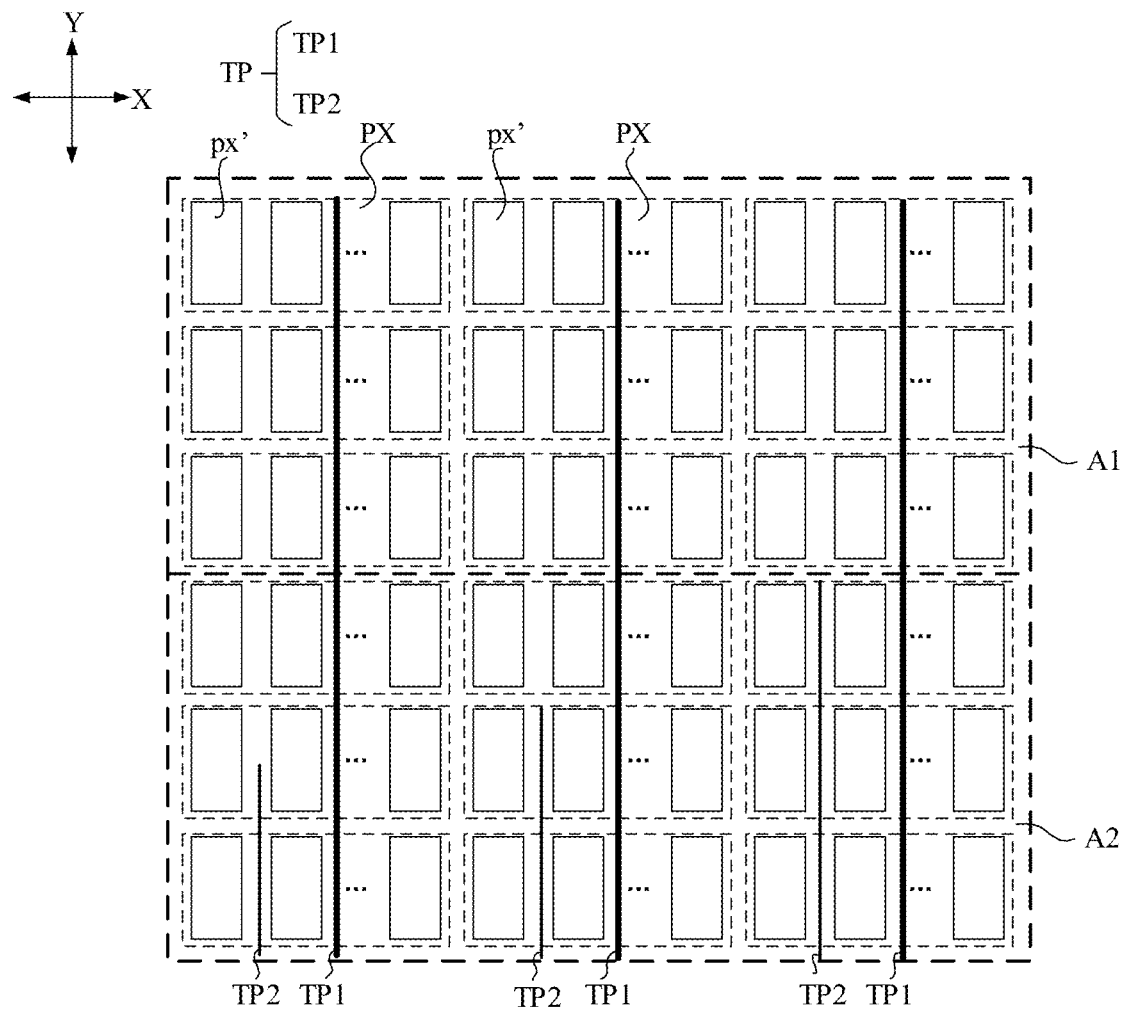
FIG. 3 is yet another schematic structural view of a touch display panel according to an embodiment of the present application.

FIG. 3 is yet another schematic structural view of a touch display panel according to an embodiment of the present application. As shown in FIG. 3, according to some embodiments of the present application, optionally, each of the first display area A1 and the second display area A2 may include a plurality of pixel units PX arranged along the second direction X. Specifically, each of the first display area A1 and the second display area A2 may include a plurality of pixel rows arranged along the first direction Y, and each pixel row may include a plurality of pixel units PX arranged along the second direction X. The pixel unit PX may include a plurality of sub-pixels px' arranged at intervals along the second direction X.

One pixel unit PX may correspond to two touch signal lines TP Each of the two touch signal lines TP may be arranged between sub-pixels px' of the pixel unit X along the second direction X, and the sub-pixels px' between which one of the two touch signal lines TP is arranged may be at least partially different from the sub-pixels px' between which the other of the two touch signal lines TP is arranged.

For example, in some examples, each of the two touch signal lines TP corresponding to an $i^{th}$ pixel unit PX may be positioned between a plurality of sub-pixels px' in the $it^h$ pixel unit PX. For example, one of the touch signal lines TP is positioned between a first sub-pixel px' and a second sub-pixel px' in the pixel unit PX, and the other of the touch signal lines TP is positioned between the second sub-pixel px' and a third sub-pixel px' in the $i^{th}$ pixel unit PX. i is a positive integer. For example, in other examples, between the two touch signal lines TP corresponding to the $it^h$ pixel unit PX, one of the touch signal lines TP may be positioned between any two sub-pixels px' in the pixel unit PX, and the other of the touch signal lines TP may be positioned between the $i^{th}$ pixel unit PX and an $i+1^{th}$ pixel unit PX. The $i^{th}$ pixel unit PX is adjacent to the $i+1^{th}$ pixel unit PX.

With further reference to FIG. 3, one of the two touch signal lines TP corresponding to the pixel unit PX is the first touch signal line TP1, and the other of the two touch signal lines TP corresponding to the pixel unit PX is the second touch signal line TP2. As such, between the two touch signal lines TP corresponding to the pixel unit PX, one of the touch signal lines TP is electrically connected to a touch electrode in the first display area A1, and the other of the two touch signal lines TP corresponding to the pixel unit PX is electrically connected to a touch electrode in the second display area A2.

As such, on the basis of one touch signal line TP corresponding to one pixel unit PX, one additional touch signal line TP is added, that is, one pixel unit PX corresponds to two touch signal lines TP, which meets a requirement on the number of touch signal lines in the touch display panel and solves a problem that the number of the touch signal lines is insufficient. Further, the two touch signal lines TP corresponding to the pixel unit PX is composed of one thin touch signal line and one thick touch signal line. The thin second touch signal line TP2 is used for the touch electrode in the second display area A2, so that the shielding of light by the second touch signal line TP2 is mitigated and the aperture ratio of the touch display panel is increased. The thick first touch signal line TP1 is still used for the touch electrode in the first display area A1, which can ensure that the first touch signal line TP1 which is relatively long have a small impedance and thus the touch electrode in the first display area A1 has desired touch sensitivity. Furthermore, between the two adjacent touch signal lines TP corresponding to the pixel unit PX, one of the touch signal lines TP is electrically connected to the touch electrode in the first display area A1 and the other of the touch signal lines TP is electrically connected to the touch electrode in the second display area A2. As such, the touch electrodes connected to the two adjacent touch signal lines TP are away from each other. Therefore, the touch electrodes connected to the two adjacent touch signal lines TP are unlikely to be touched at the same time, which effectively prevents the two adjacent touch signal lines from being coupled with a same data signal line and reduces the crosstalk of the data signal lines and improves the display quality.

Figure 4:
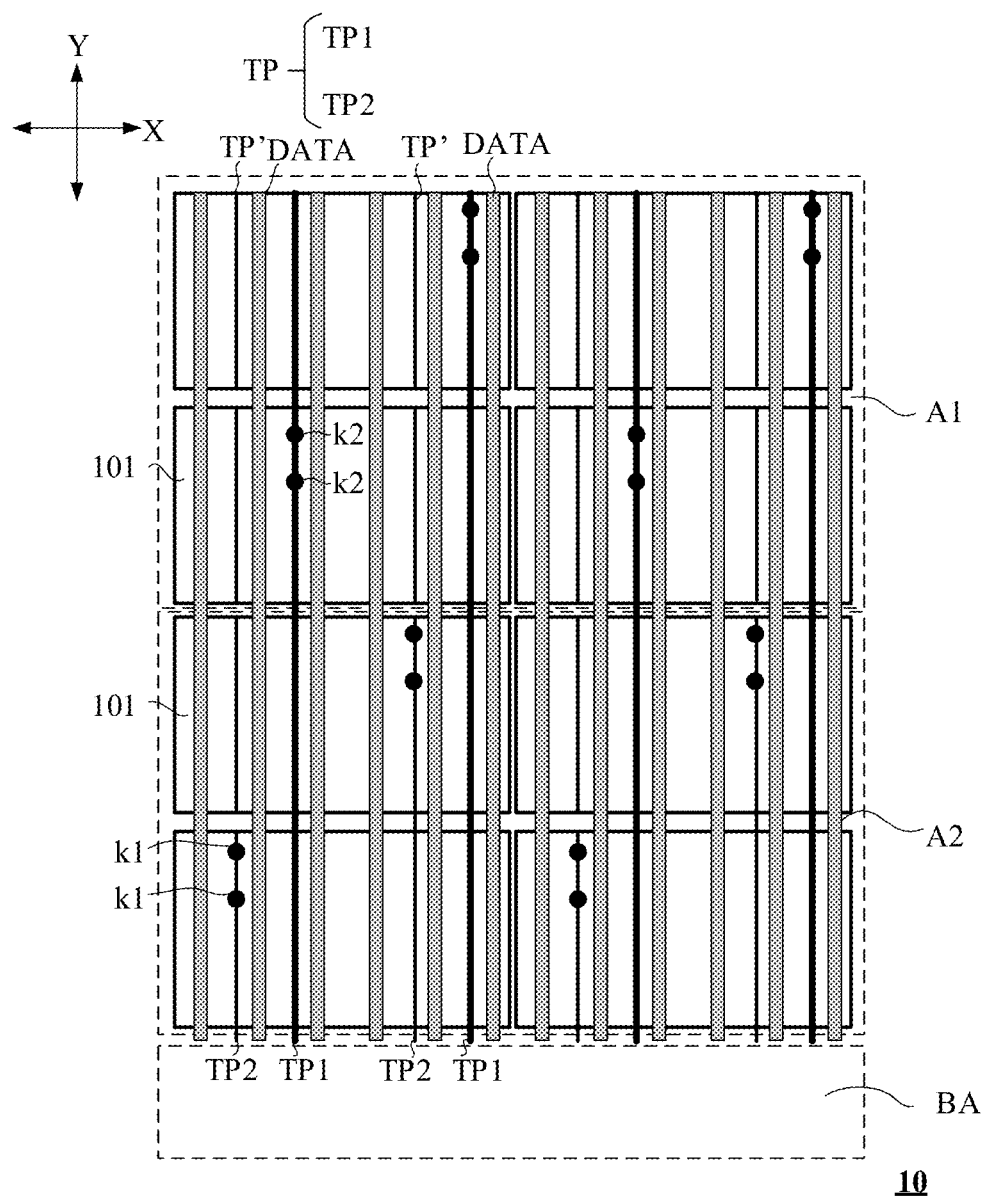
FIG. 4 is yet another schematic structural view of a touch display panel according to an embodiment of the present application.

FIG. 4 is yet another schematic structural view of a touch display panel according to an embodiment of the present application. As shown in FIG. 4, according to some embodiments of the present application, optionally, the second touch signal lines TP2 and the touch electrodes 101 may be positioned in different film layers, and a specific film layer structure will be described below. The second touch signal line TP2 may terminate along the first direction Y after being electrically connected to a touch electrode 101 by a first via k1, that is, the second touch signal line TP2 terminates after being electrically connected to the touch electrode 101 by the first via k1. For example, after being electrically connected to the touch electrode 101, the second touch signal line TP2 immediately terminates or extends to an edge of the correspondingly connected touch electrode 101. For example, a first end of the second touch signal line TP2 is electrically connected to the touch bonding pad, and a distance between a second end of the second touch signal line TP2 and the first via k1 is less than a preset distance threshold. In an example, the preset distance threshold is, for example, a length of n pixel units, where n is a positive integer. The value of the preset distance threshold may be flexibly adjusted according to actual situations, which is not limited in the embodiments of the present application.

In addition, after being electrically connected to a touch electrode 101 by a second via k2, the first touch signal line TP1 may terminate along the first direction Y or may extend to an edge of the first display area A1 away from the second display area A2 (the upper edge shown in FIG. 4), which is not limited in the embodiments of the present application.

It should be noted that, in an embodiment of the present application, each second touch signal line TP2 may be electrically connected to a touch electrode 101 by one first via k1, or may be electrically connected to the touch electrode 101 by a plurality of first vias k1, which increases stability of electrical connection. Similarly, each first touch signal line TP1 may be electrically connected to a touch electrode 101 by one second via k2, or may be electrically connected to the touch electrode 101 by a plurality of second vias k2. For example, in the embodiment shown in FIG. 4, each second touch signal line TP2 may be electrically connected to a touch electrode 101 by two first vias k1, and each first touch signal line TP1 may be electrically connected to a touch electrode 101 by two second vias k2.

Figure 5:
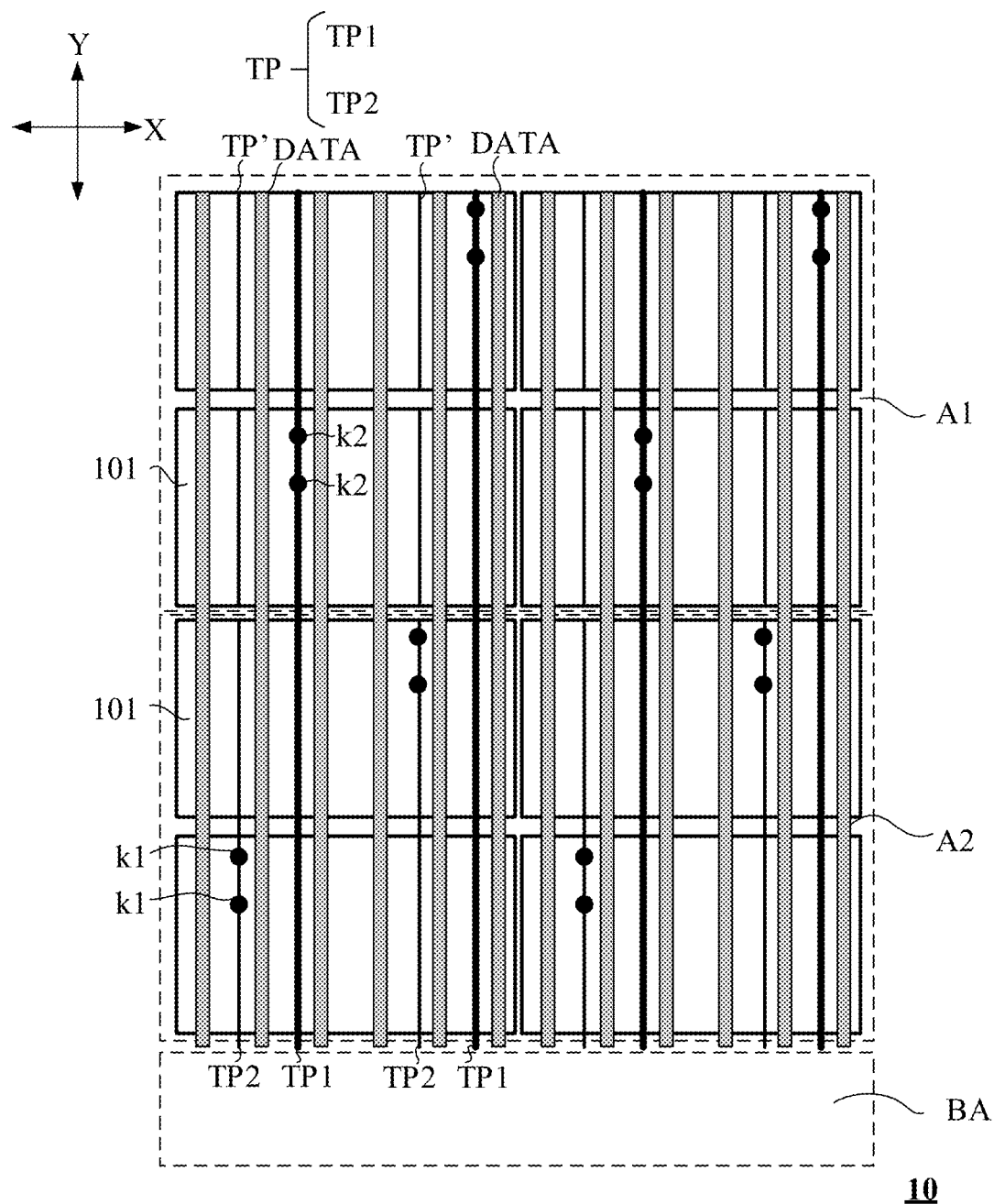
FIG. 5 is yet another schematic structural view of a touch display panel according to an embodiment of the present application.

FIG. 5 is yet another schematic structural view of a touch display panel according to an embodiment of the present application. As shown in FIG. 5, in contrast to the embodiments shown in FIG. 4, according to other embodiments of the present application, optionally, after being electrically connected to a touch electrode 101 by a first via kl, the second touch signal line TP2 may extend to and terminate at an edge of the second display area A2 close to the first display area A1. As such, along the first direction Y, the second to touch signal line TP2 may pass through the entire second display area A2.

In addition, after being electrically connected to a touch electrode 101 by a second via k2, the first touch signal line TP1 may terminate along the first direction Y or may extend to an edge of the first display area A1 away from the second display area A2 (the upper edge shown in FIG. 5), which is not limited in the embodiments of the present application.

With further reference to FIG. 4 or FIG. 5, according to some embodiments of the present application, optionally, the touch display panel 10 may further include dummy touch signal lines TP' electrically connected to the touch electrodes 101. Along the direction perpendicular to the plane where the touch display panel is positioned, the dummy touch signal line TP' may overlap a touch electrode 101. One second touch signal line TP2 may correspond to at least one dummy touch signal line TP'. Along the first direction Y, the at least one dummy touch signal line TP' corresponding to the second touch signal line TP2 may be positioned on a side of the second touch signal line TP2 away from the binding area BA. Along the first direction Y, the at least one dummy touch signal line TP' corresponding to the second touch signal line TP2 may be positioned on a same straight line as the second touch signal line TP2. Different second touch signal lines TP2 may correspond to a same number of dummy touch signal lines TP' or different numbers of dummy touch signal lines TP'. In an example as shown in FIG. 4, for example, the first one of the second touch signal lines TP2 from the left may correspond to three dummy touch signal lines TP', and the second one of the second touch signal lines TP2 from the left may correspond to two dummy touch signal lines TP'. However, the three dummy touch signal lines TP' corresponding to the first one of the second touch signal lines TP2 may be connected together, so that the number of the dummy touch signal lines TP' corresponding to the first one of the second touch signal lines TP2 becomes 1. Similarly, the two dummy touch signal lines TP' corresponding to the second one of the second touch signal lines TP2 may be connected together, so that the number of the dummy touch signal lines TP' corresponding to the second one of the second touch signal lines TP2 also becomes 1.

In some specific examples, a width of the dummy touch signal line TP' and the width of the second touch signal line TP2 may be the same, which improves the aperture ratio of the touch display panel.

As shown in FIG. 4 or FIG. 5, the touch display panel 10 may further include a plurality of data signal lines DATA. The plurality of data signal lines DATA extend along the first direction Y and are arranged at intervals along the second direction X. Each data signal line DATA may be electrically connected to one column of sub-pixels and configured to provide data signals. The data signal lines DATA are close to the touch signal lines TP (including the first touch signal lines TP1 and the second touch signal lines TP2), so that the data signal lines DATA may be coupled with the touch signal lines TP. When lengths of touch signal lines TP corresponding to adjacent data signal lines DATA are different, coupling capacitances generated on the adjacent data signal lines DATA are different, which results in display differences. With the adding of the dummy touch signal lines TP', microscopic appearances of the pixels in different areas of the touch display panel 10 can be ensured to be same, and in addition, electric potentials and electric fields in the different areas of the touch display panel 10 can be ensured to be substantially the same. For example, the dummy touch signal line TP' is connected to a common electrode line around the display area or a corresponding touch electrode by a via or a bridge, so as to ensure that the electric potential of the dummy touch signal line TP' and the electric potential of the touch signal line TP during a displaying process are a common potential, and the electric potential of the dummy touch signal line TP' and the electric potential of the touch signal line TP during a touching process are same as the electrical potential of the touch electrode electrically connected to the dummy touch signal line TP'. The potential of the dummy touch signal line TP' is same as or approximate to the potential of the touch signal line TP, and a sum of lengths of a touch signal line TP and a dummy touch signal line TP' corresponding to a data signal line DATA is the same as or approximate to a sum of lengths of a touch signal line TP and a dummy touch signal line TP' corresponding to an adjacent data signal line DATA, so that the coupling capacitances generated on the adjacent data signal lines DATA are the same as or approximate to each other and the display quality is improved.

Figure 6:
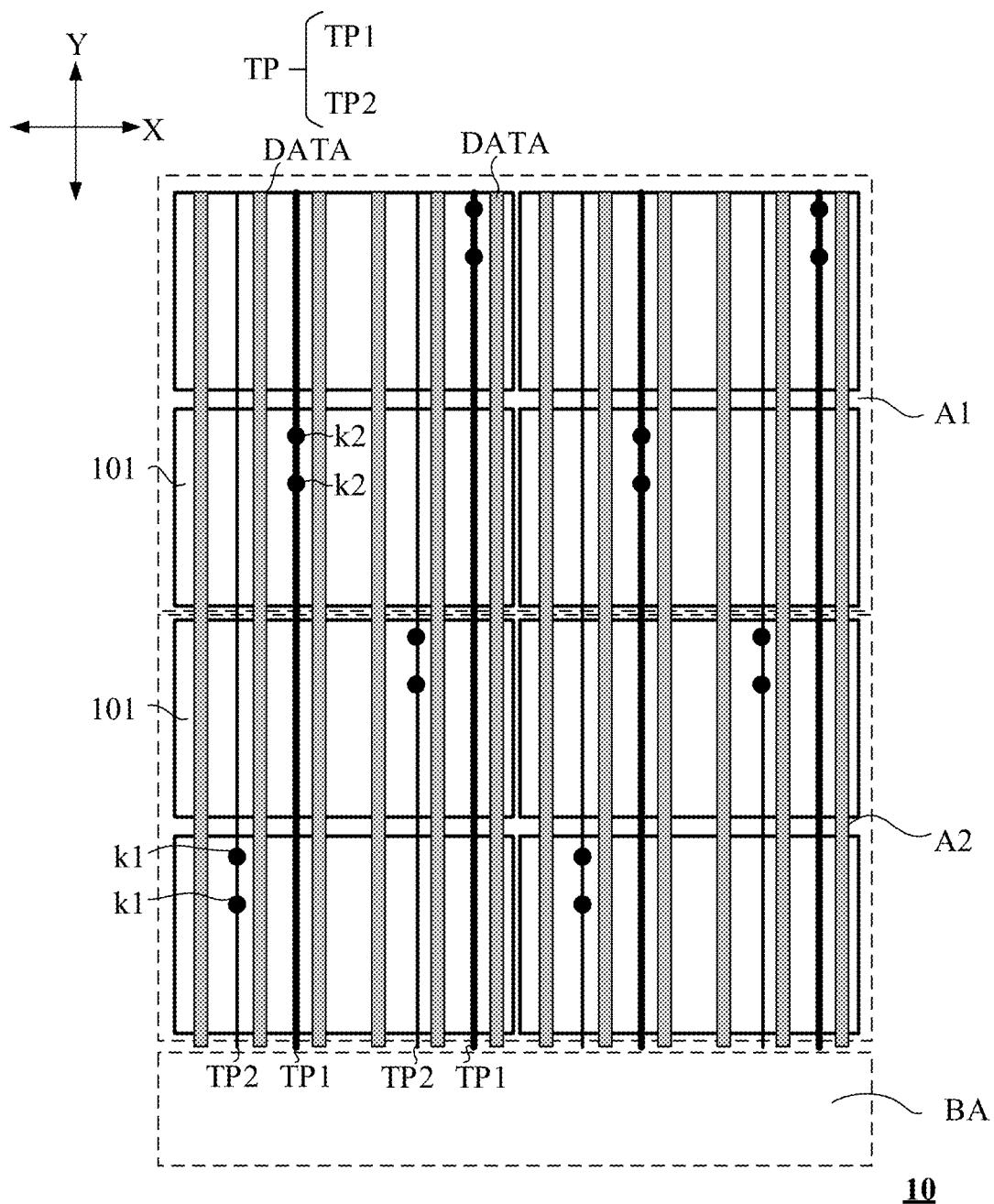
FIG. 6 is yet another schematic structural view of a touch display panel according to an embodiment of the present application.

FIG. 6 is yet another schematic structural view of a touch display panel according to an embodiment of the present application. As shown in FIG. 6, in contrast to the embodiments shown in FIG. 4 and FIG. 5, according to some other embodiments of the present application, optionally, the second touch signal line TP2 may extend to and terminate at the first display area A1 after being electrically connected to a touch electrode 101 by a first via k1. For example, the second touch signal line TP2 may extend to the edge of the first display area A1 away from the second display area A2 (the upper edge shown in FIG. 6). Of course, the second touch signal line TP2 may extend to and terminate at any position in the first display area A1, which is not limited in the embodiments of the present application.

In addition, after being electrically connected to a touch electrode 101 by a second via k2, the first touch signal line TP1 may terminate along the first direction Y or may extend to the edge of the first display area A1 away from the second display area A2 (the upper edge shown in FIG. 6), which is not limited in the embodiments of the present application.

In some specific embodiments, optionally, a length of the second touch signal line TP2 may be same as a length of the first touch signal line TP1, and the length is a minimum distance along the first direction Y. For example, each of the first touch signal line TP1 and the second touch signal line TP2 may extend to the edge of the first display area A1 away from the second display area A2 (the upper edge shown in FIG. 6).

As such, the length of the second touch signal line TP2 may be the same as the length of the first touch signal line TP1, so that no additional dummy touch signal line TP' needs to be arranged, which ensures that the coupling capacitances generated on adjacent data signal lines DATA are the same as or approximate to each other and ensures that the touch display panel has desired display quality.

It should be noted that, the length of the second touch signal line TP2 being the same as the length of the first touch signal line TP1 may include the case where the length of the second touch signal line TP2 is exactly the same as the length of the first touch signal line TP1, or may include the case where a machining error exists between the length of the second touch signal line TP2 and the length of the first touch signal line TP1.

Figure 7:
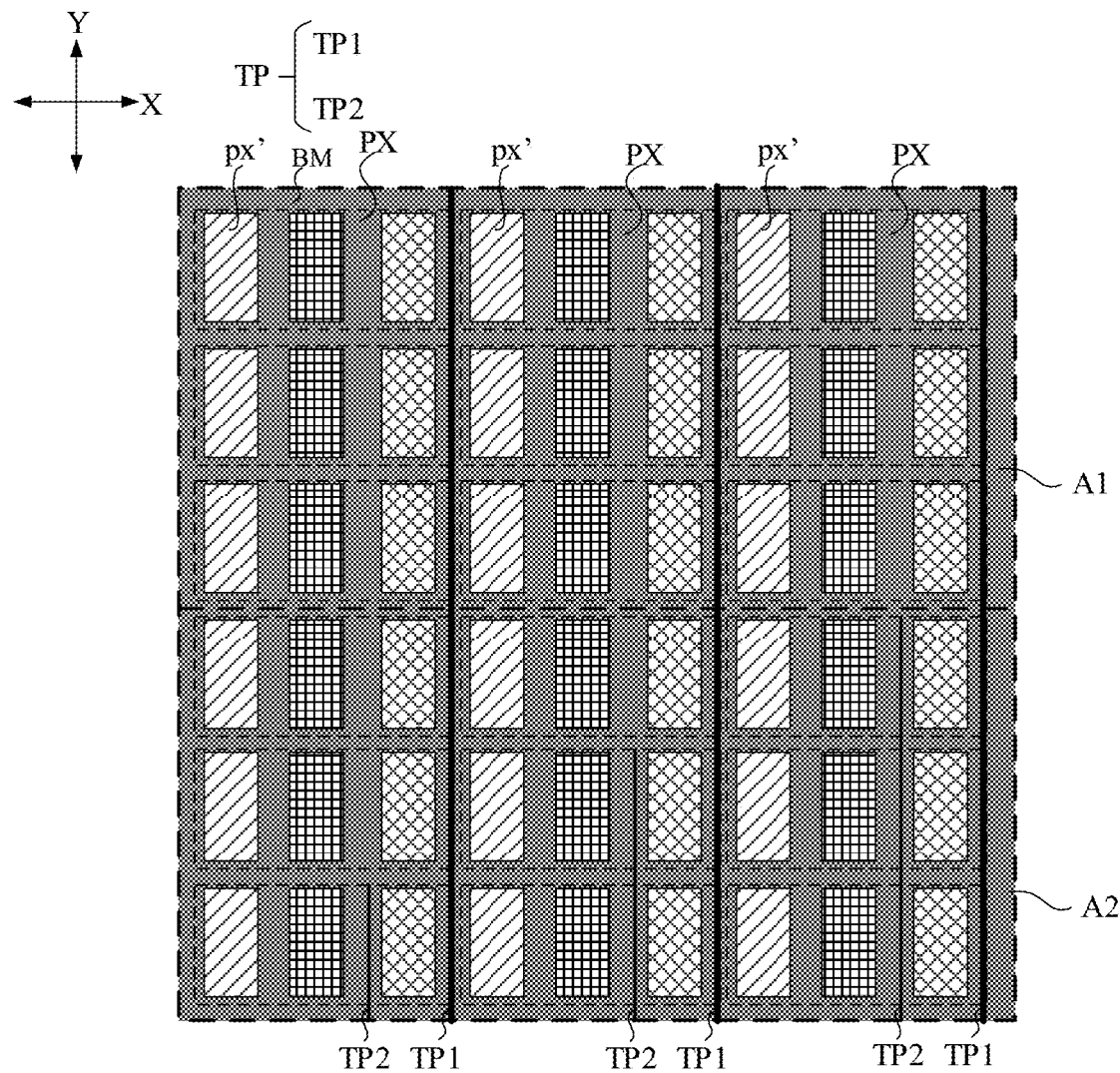
FIG. 7 is a schematic top view of a touch display panel according to an embodiment of the present application.
Figure 8:
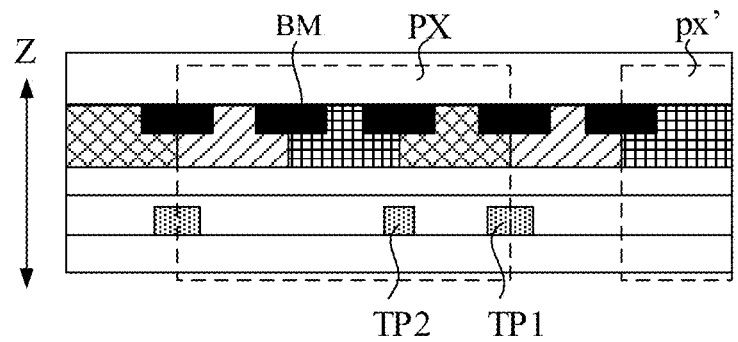
FIG. 8 is a schematic partial sectional view of a touch display panel according to an embodiment of the present application.

FIG. 7 is a schematic top view of a touch display panel according to an embodiment of the present application. FIG. 8 is a schematic partial sectional view of a touch display panel according to an embodiment of the present application. As shown in FIG. 7 and FIG. 8, according to some embodiments of the present application, optionally, the touch display panel 10 may further include black matrixes BM. Each of the first display area A1 and the second display area A2 may include a plurality of pixel units PX arranged along the second direction X. One pixel unit PX may include a plurality of sub-pixels px' separated by the black matrixes BM along the second direction X. Along a direction Z perpendicular to a plane where the touch display panel is positioned, the touch signal line TP may at least partially overlap a black matrix BM. The touch signal line TP includes the first touch signal line TP1 and the second touch signal line TP2. The touch signal line TP at least partially overlapping a black matrix BM may include the case where along the direction Z perpendicular to the plane where the touch display panel is positioned, an orthographic projection of the black matrix BM completely covers the touch signal line TP, or may include the case where along the direction Z perpendicular to the plane where the touch display panel is positioned, the touch signal line TP only partially overlaps the black matrix BM, which is not limited in the embodiments of the present application.

As such, because the touch signal line TP is arranged in an area at least partially overlapping the black matrix BM whose light transmittance is already low, a proportion of an area with low light transmittance in the touch display panel decreases, which further improves the aperture ratio of the touch display panel.

Figure 9:
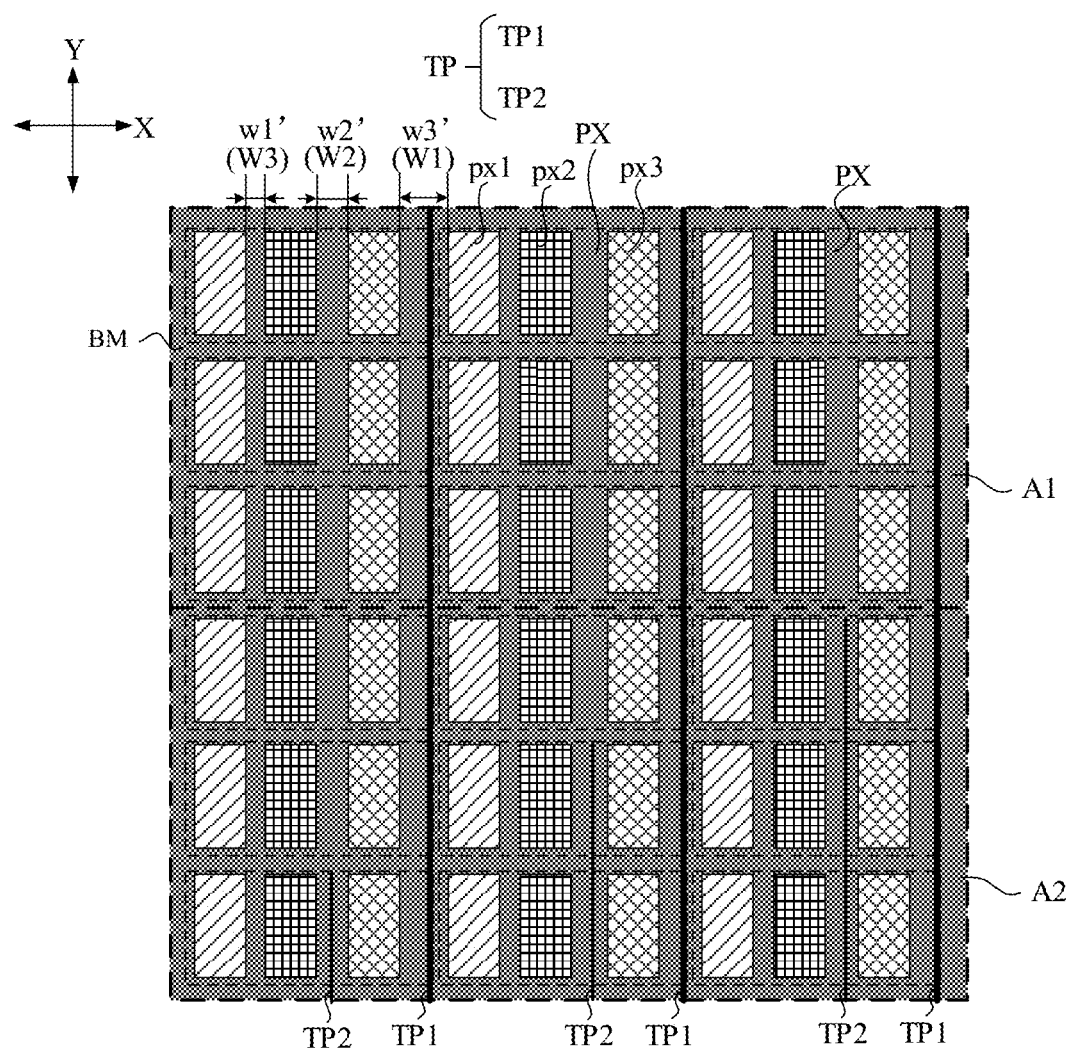
FIG. 9 is another schematic top view of a touch display panel according to an embodiment of the present application.
Figure 10:
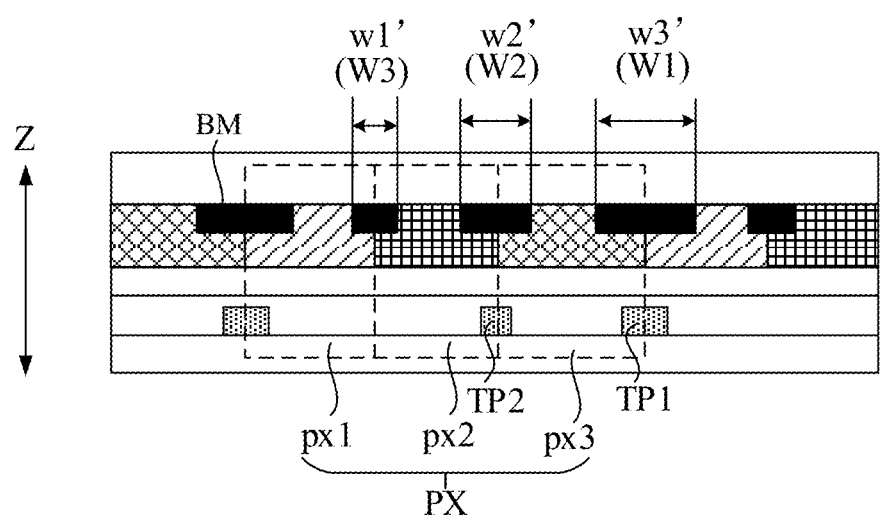
FIG. 10 is another schematic partial sectional view of a touch display panel according to an embodiment of the present application.

FIG. 9 is another schematic top view of a touch display panel according to an embodiment of the present application. FIG. 10 is another schematic partial sectional view of a touch display panel according to an embodiment of the present application. With reference to FIG. 9 and FIG. 10, according to some embodiments of the present application, optionally, the pixel unit PX may include a first color sub-pixel px1, a second color sub-pixel px2 and a third color sub-pixel px3, which are arranged at intervals along the second direction X. Along the second direction X, a width w1' of a black matrix BM adjacent to the first color sub-pixel px1, a width w2' of a black matrix BM adjacent to the second color sub-pixel px2 and a width w3' of a black matrix BM adjacent to the third color sub-pixel px3 may be different from one another. It should be noted that, the black matrix BM adjacent to the first color sub-pixel px1 may be the black matrix BM adjacent to and on the right side of the first color sub-pixel px1 as shown in FIG. 9. In other examples, the black matrix BM adjacent to the first color sub-pixel px1 may be the black matrix BM adjacent to and on the left side of the first color sub-pixel px1. Similarly, when the black matrix BM adjacent to the first color sub-pixel px1 is the black matrix BM adjacent to and on the left side of the first color sub-pixel px1, the black matrix BM adjacent to the second color sub-pixel px2 may be the black matrix BM adjacent to and on the left side of the second color sub-pixel px2 and the black matrix BM adjacent to the third color sub-pixel px3 may be the black matrix BM adjacent to and on the left side of the first color sub-pixel px3.

One pixel unit PX may correspond to one first touch signal line TP1 and one second touch signal line TP2. Along the direction Z perpendicular to the plane where the touch display panel is positioned, the first touch signal line TP1 may overlap a widest black matrix BM among the black matrix BM adjacent to the first color sub-pixel px1, the black matrix BM adjacent to the second color sub-pixel px2 and the black matrix BM adjacent to the third color sub-pixel px3. Along the direction Z perpendicular to the plane where the touch display panel is positioned, the second touch signal line TP2 may overlap a second widest black matrix BM among the black matrix BM adjacent to the first color sub-pixel px1, the black matrix BM adjacent to the second color sub-pixel px2 and the black matrix BM adjacent to the third color sub-pixel px3.

For example, the width w3' of the black matrix BM adjacent to the third color sub-pixel px3 is wider than the width w2' of the black matrix BM adjacent to the second color sub-pixel px2, and the width w2' of the black matrix BM adjacent to the second color sub-pixel px2 is wider than the width w1' of the black matrix BM adjacent to the first color sub-pixel px1. Along the direction Z perpendicular to the plane where the touch display panel is positioned, the first touch signal line TP1 may overlap the black matrix BM adjacent to the third color sub-pixel px3, and the second touch signal line TP2 may overlap the black matrix BM adjacent to the first color sub-pixel px 1.

As such, the first touch signal line TP1 overlaps the widest black matrix BM among the black matrix BM adjacent to the first color sub-pixel px1, the black matrix BM adjacent to the second color sub-pixel px2 and the black matrix BM adjacent to the third color sub-pixel px3, and the second touch signal line TP2 overlaps the second widest black matrix BM among the black matrix BM adjacent to the first color sub-pixel px1, the black matrix BM adjacent to the second color sub-pixel px2 and the black matrix BM adjacent to the third color sub-pixel px3, that is, the first touch signal line TP1 and the second touch signal line TP2 are arranged under the widest black matrix BM and the second widest black matrix BM. Therefore, it can be ensured that the first touch signal line TP1 and the second touch signal line TP2 overlap the black matrix BM as much as possible, which significantly decreases the proportion of the area with lower light transmittance in the touch display panel area and further increases the aperture ratio of the touch display panel.

With further reference to FIG. 9, according to some embodiments of the present application, optionally, along the second direction X, a width of a black matrix BM between a third color sub-pixel px3 in a pixel unit PX and a first color sub-pixel px1 in an adjacent pixel unit PX is a first width W1, a width of a black matrix BM between the third color sub-pixel px3 and a second color sub-pixel px2 in the pixel unit PX is a second width W2, and a width of a black matrix BM between the second color sub-pixel px2 and a first color sub-pixel px1 in the pixel unit PX is a third width W3. The first width W1> the second width W2> the third width W3. In an example, the first color sub-pixel px1 may include a red sub-pixel, the second color sub-pixel px2 may include a green sub-pixel, and the third color sub-pixel px3 may include a blue sub-pixel. That is, in an embodiment shown in FIG. 9, the width of the black matrix BM between the blue sub-pixel and the red sub-pixel is the greatest, the width of to the black matrix BM between the blue sub-pixel and the green sub-pixel is the second greatest, and the width of the black matrix BM between the red sub-pixel and the green sub-pixel is the smallest.

Such arrangement is advantageous. Human eyes have different sensitivities to different colors, for example, human eyes are the least sensitive to blue. Therefore, the widest black matrix BM and the second widest black matrix BM are arranged on the left side and the right side of the blue sub-pixels respectively, and the first touch signal line TP1 and the second touch signal line TP2 are arranged under the widest black matrix BM and the second widest black matrix BM respectively. A possible influence of the first touch signal line TP1 and the second touch signal line TP2 on light emitted by the blue sub-pixel is not easily perceived by human eyes, which ensures a desired display effect.

Figure 11:
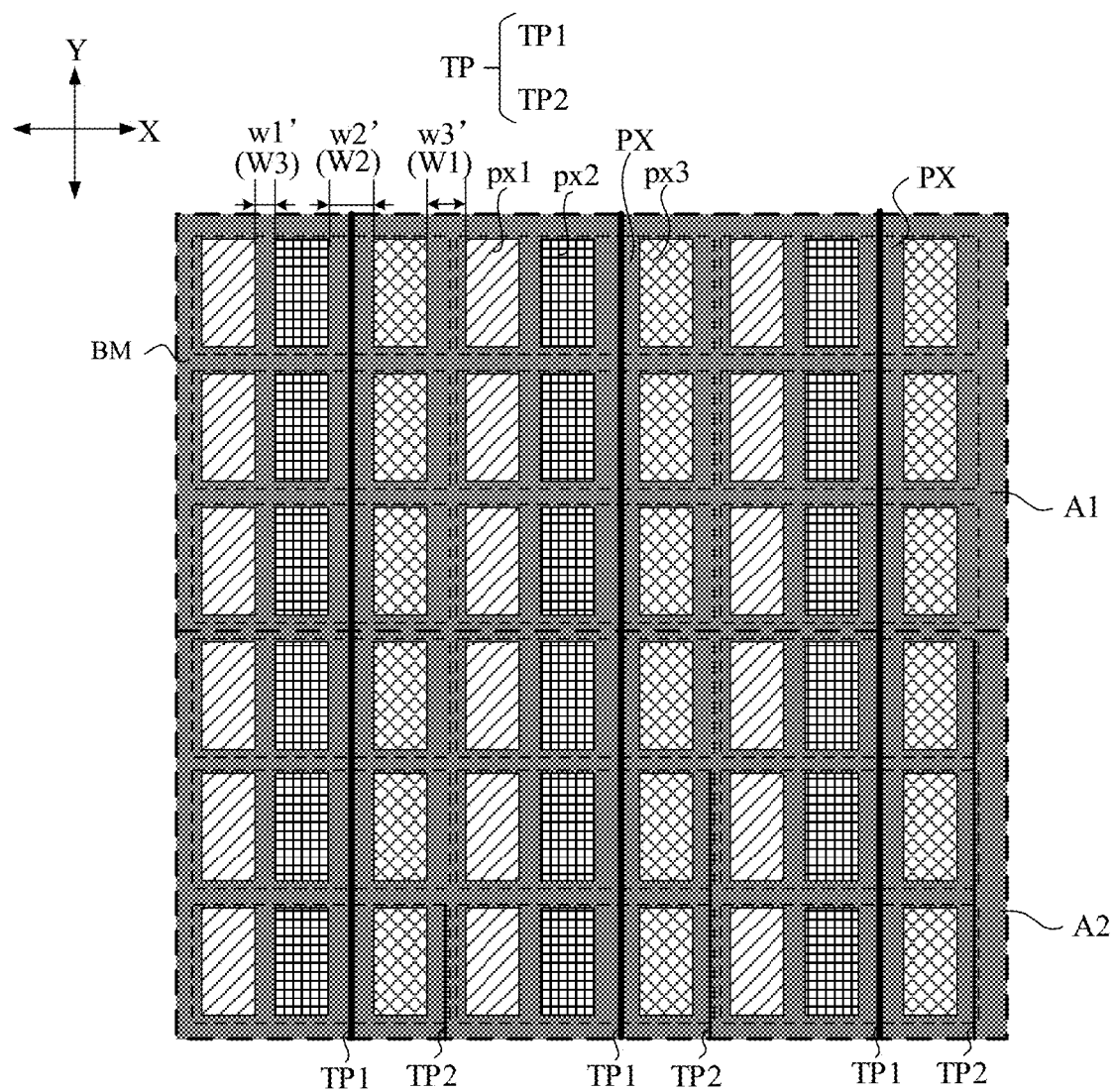
FIG. 11 is another schematic top view of a touch display panel according to an embodiment of the present application.

FIG. 11 is another schematic top view of a touch display panel according to an embodiment of the present application. As shown in FIG. 11, in contrast to the embodiment shown in FIG. 9, according to other embodiments of the present application, optionally, the second width W2>the first width W1>the third width W3. The first color sub-pixel px1 being the red sub-pixel, the second color sub-pixel px2 being the green sub-pixel and the third color sub-pixel px3 being the blue sub-pixels is still taken as an example. In an embodiment shown in Fig. 11, a width of the black matrix BM between the blue sub-pixel and the green sub-pixel is the greatest, a width of the black matrix BM between the blue sub-pixel and the red sub-pixel is the second greatest, and a width of the black matrix between the red sub-pixel and the green sub-pixel BM is the smallest.

Similarly, the widest black matrix BM and the second widest black matrix BM are arranged on the left side and the right side of the blue sub-pixel respectively, and the first touch signal line TP1 and the second touch signal line TP2 are arranged under the widest black matrix BM and the second widest black matrix BM respectively. Even if the first touch signal line TP1 and the second touch signal line TP2 are defective or have an impact on the light emitted by the blue sub-pixel, the influence is not easily perceived by human eyes, so that a desired display effect is ensured.

In other embodiments, optionally, it may be the case where the first width W1 >the third width W3> the second width W2. The first color sub-pixel px1 being the red sub-pixel, the second color sub-pixel px2 being the green sub-pixel and the third color sub-pixel px3 being the blue sub-pixel is still taken as an example. A width of the black matrix BM between the blue sub-pixel and the red sub-pixel is the greatest, a width of the black matrix BM between the red sub-pixel and the green sub-pixel is the second greatest, and a width of the black matrix BM between the blue sub-pixel and the green sub-pixel is the smallest. Therefore, arranging the first touch signal line TP1 and the second touch signal line TP2 under the black matrix BM adjacent to the blue sub-pixel and the black matrix BM adjacent to the red sub-pixel respectively can achieve a similar effect.

Figure 12:
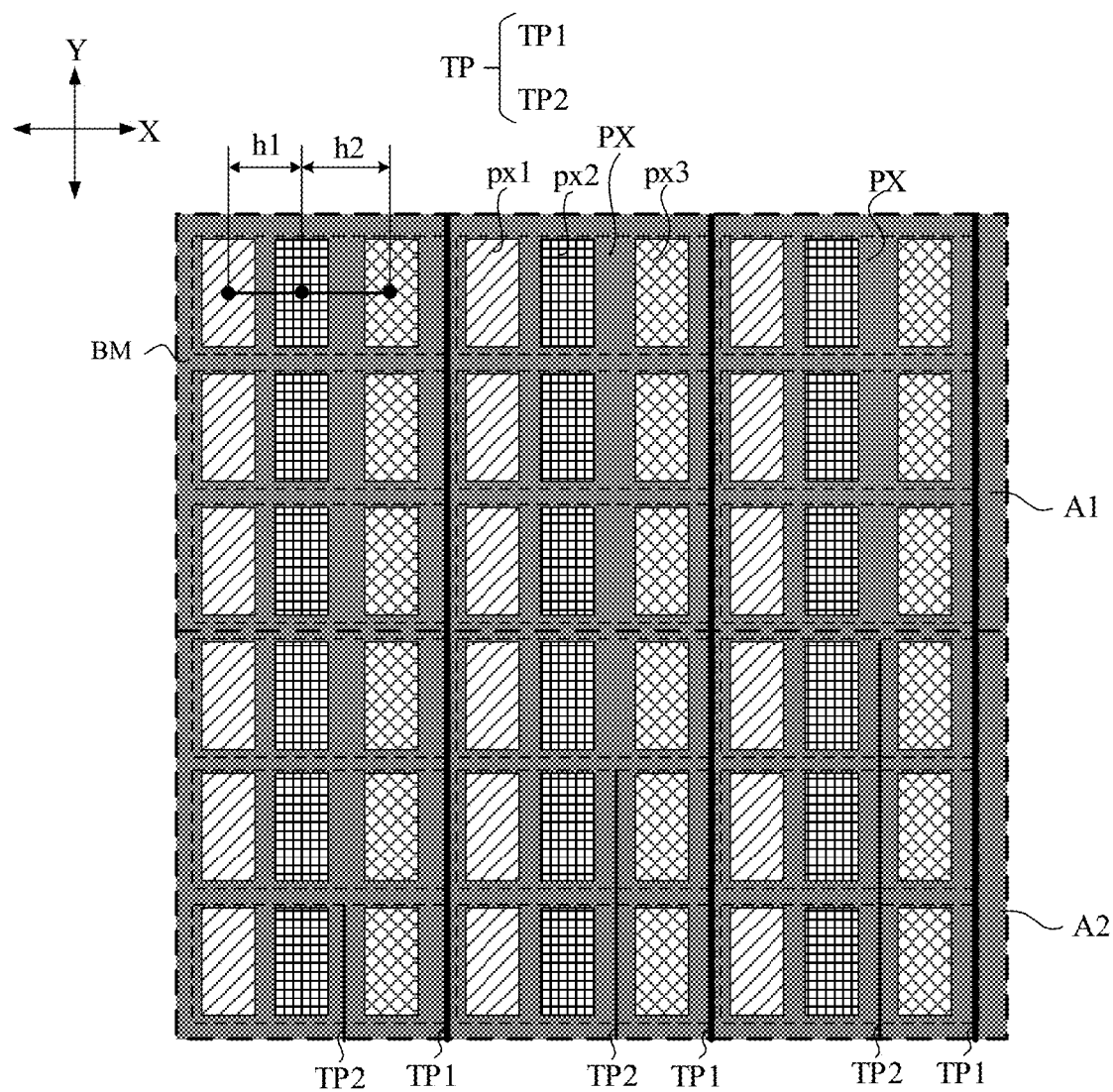
FIG. 12 is another schematic top view of a touch display panel according to an embodiment of the present application.

FIG. 12 is another schematic top view of a touch display panel according to an embodiment of the present application. As shown in FIG. 12, according to some embodiments of the present application, optionally, along the second direction X, a distance between a center point of the first color sub-pixel px1 and a center point of the second color sub-pixel px2 is a first distance h1, and a distance between the center point of the second color sub-pixel px2 and a center point of the third color sub-pixel px3 is a second distance h2. The first distance h1 may be not equal to the second distance h2. A pixel opening of the first color sub-pixel px1, a pixel opening of the second color sub-pixel px2 and a pixel opening of the third color sub-pixel px3 may be of a same size. Along the direction perpendicular to the plane where the touch display panel is positioned, the widest black matrix BM can completely cover the first touch signal line TP1, and the second widest black matrix BM can completely cover the second touch signal line TP2. That is, by adjusting the widths of the black matrixes BM, the widest black matrix BM can completely cover the first touch signal line TP1 and the second widest black matrix BM can completely cover the second touch signal line TP2.

Figure 13:
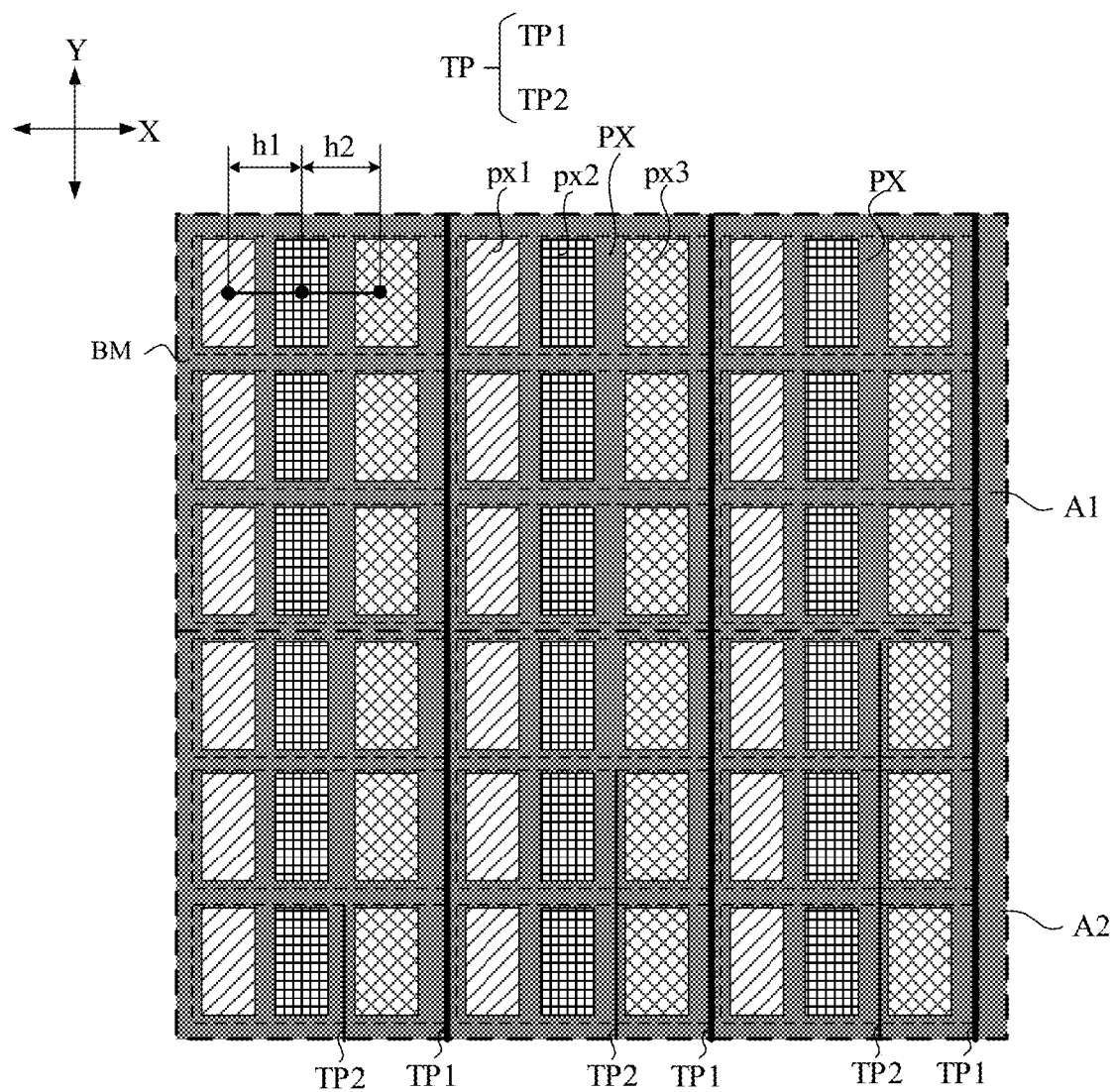
FIG. 13 is another schematic top view of a touch display panel according to an embodiment of the present application.

FIG. 13 is another schematic top view of a touch display panel according to an embodiment of the present application. As shown in FIG. 13, in contrast to the embodiment shown in FIG. 12, according to some embodiments of the present application, optionally, along the second direction X, a distance between a center point of the first color sub-pixel px1 and a center point of the second color sub-pixel px2 is a first distance h1, and a distance between the center point of the second color sub-pixel px2 and a center point of the third color sub-pixel px3 is a second distance h2. The first distance h1 may be equal to the second distance h2. A pixel opening of the first color sub-pixel px1, a pixel opening of the second color sub-pixel px2 and a pixel opening of the third color sub-pixel px3 may be of different sizes. Along the direction perpendicular to the plane where the touch display panel is positioned, the widest black matrix BM completely covers the first touch signal line TP1, and the second widest black matrix BM completely covers the second touch signal line TP2. That is, in an embodiment shown in FIG. 13, by adjustment the size of the pixel opening of the first color sub-pixel px1, the size of the pixel opening of the second color sub-pixel px2 and the size of the pixel opening of the third color sub-pixel px3, the widest black matrix BM completely covers the first touch signal line TP1 and the second widest black matrix BM completely covers the second touch signal line TP2.

It should be noted that, although it is described above for illustration that the pixel unit PX includes the first color sub-pixel px1, the second color sub-pixel px2 and the third color sub-pixel px3, the pixel unit PX is not limited to including the first color sub-pixel px1, the second color sub-pixel px2 and the third color sub-pixel px3 and may further include sub-pixels of other colors. For example, the pixel unit PX may include a red sub-pixel R, a green sub-pixel G, a blue sub-pixel B and a white sub-pixel W, or the pixel unit PX may include a red sub-pixel R, a green sub-pixel G and a blue sub-pixel B and a yellow sub-pixel Y. When a design of RGBW or RGBY is adopted, an arrangement can also be made with reference to the contents described in the above embodiments of the present application.

A film layer arrangement of the touch display panel according to embodiments of the present application will be described below with reference to some embodiments of the present application.

Figure 14:
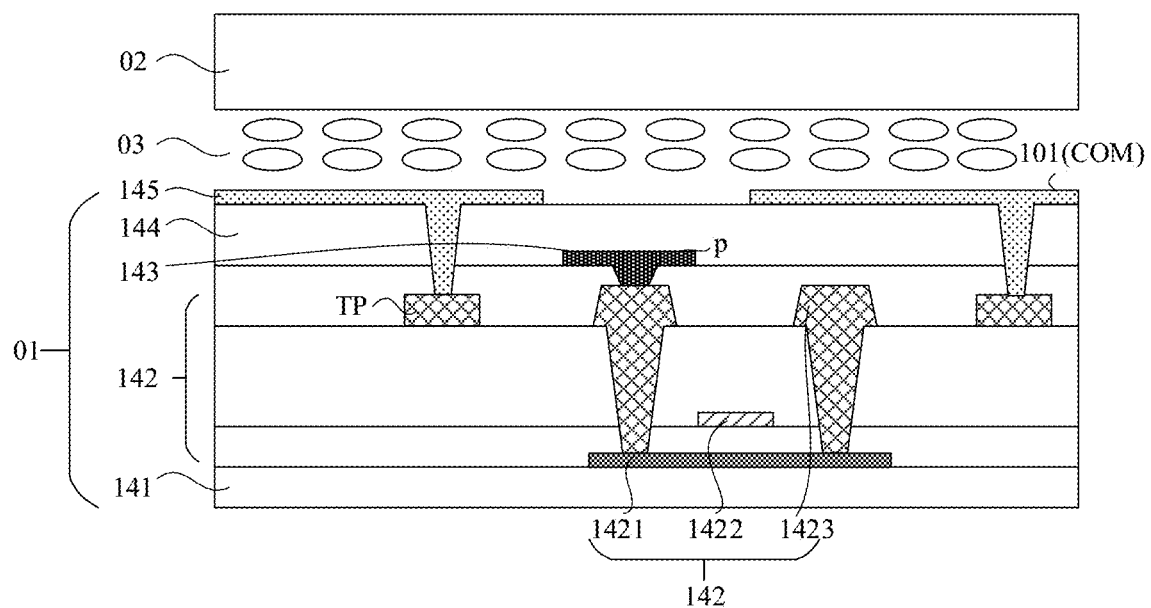
FIG. 14 is another schematic sectional view of a touch display panel according to an embodiment of the present application.

FIG. 14 is another schematic sectional view of a touch display panel according to an embodiment of the present application. As shown in FIG. 14, according to some embodiments of the present application, optionally, the touch display panel 10 may include an array substrate 01, a color filter substrate 02, and a liquid crystal layer 03 sandwiched between the array substrate 01 and the color filter substrate 02. The array substrate 01 may include a first substrate 141, a driving device layer 142, a first electrode layer 143, a first insulation layer 144 and a second electrode layer 145 that are stacked. The second electrode layer 145 may be positioned on a side of the first electrode layer 143 close to the liquid crystal layer 03. The touch signal lines TP may be positioned in the driving device layer 142. The touch electrodes 101 may be positioned in the first electrode layer 143 or the second electrode layer 145. The touch signal lines TP are connected to the touch electrodes 101 by vias.

As such, the first electrode layer 143 or the second electrode layer 145 is reused as the touch electrode 101, and the driving device layer 142 is reused as the touch signal line TP, so that the number and the thickness of the film layers of the touch display panel can be reduced, which simplifies production processes and reduces production costs.

In some examples, each of the first electrode layer 143 and the second electrode layer 145 may be a transparent electrode layer, for example, a transparent metal oxide electrode layer including indium tin oxide or tin antimony oxide, to improve a light transmittance of the touch display panel.

With further reference to FIG. 14, in some specific examples, optionally, a pixel electrode p is arranged in the first electrode layer 143, a common electrode COM is arranged in the second electrode layer 145. The common electrode may be reused as the touch electrode 101, and the touch signal lines TP are electrically connected to the common electrode COM in the second electrode layer 145 by vias. The pixel electrode p may receive a pixel voltage signal and the common electrode COM may receive a constant common voltage signal. Each of the pixel electrode p and the common electrode COM is arranged on a same side of the liquid crystal layer 03 (that is, in the array substrate 01), to form a fringe field switching (FFS) touch display panel. The common electrode COM may be in a block shape, and one common electrode COM may cover multiple sub-pixels. In a display stage, the common electrode COM receives the common voltage signal and is used as a common electrode. In a touch stage, the common electrode COM receives the touch driving signal and is used as a touch electrode.

The driving device layer 142 may include an active layer 1421, a first metal layer 1422 and a second metal layer 1423 that are stacked, as well as insulation layers sandwiched between any two adjacent film layers. The first metal layer 1422 may be used for arranging a gate signal line and a gate of a transistor, and the second metal layer 1423 may be used for arranging a source and a drain of the transistor. Specifically, the second metal layer 1423 may be reused as the touch signal line TP.

As such, the second electrode layer 145 is reused as the touch electrode 101, and the second metal layer 1423 is reused as the touch signal line TP, so that the number and the thickness of the film layers of the touch display panel can be reduced, which simplifies the production processes and reduces the production costs.

Figure 15:
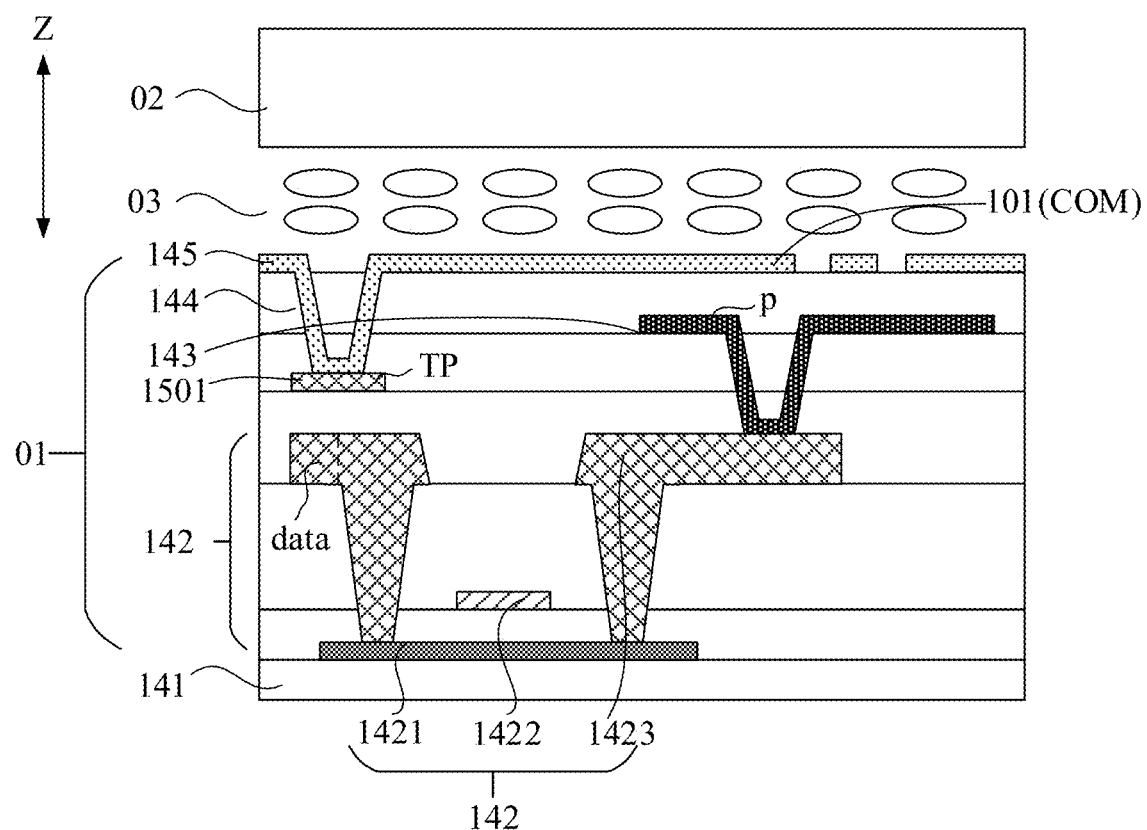
FIG. 15 is another schematic sectional view of a touch display panel according to an embodiment of the present application.

FIG. 15 is another schematic sectional view of a touch display panel according to an embodiment of the present application. As shown in FIG. 15, in contrast to the embodiments shown in FIG. 14, according to some other embodiments of the present application, optionally, the array substrate 01 may further include a target wiring layer 1501. Along the direction Z perpendicular to the plane where the touch display panel is positioned, the target wiring layer 1501 is positioned between the driving device layer 142 and the first electrode layer 143. For example, the target wiring layer 1501 is positioned between the second metal layer 1423 and the first electrode layer 143. Along the direction Z perpendicular to the plane where the touch display panel is positioned, an insulation layer is arranged between the target wiring layer 1501 and the driving device layer 142, and an insulation layer is arranged between the target wiring layer 1501 and the first electrode layer 143. That is, a metal wiring layer (that is, the target wiring layer 1501) is additionally arranged between the driving device layer 142 and the first electrode layer 143.

Optionally, the touch signal lines TP may be positioned in the target wiring layer 1501, and along the direction Z perpendicular to the plane where the touch display panel is positioned, the touch signal line TP may overlap (partially or completely) at least one of the source of the transistor, the drain of the transistor and the data signal line DATA in the driving device layer 142. For example, in some specific embodiments, the data signal line DATA, the source and the drain of the transistor may be positioned in the second metal layer 1423, and the data signal line DATA may be electrically connected to the source or the drain of the transistor. Along the direction Z perpendicular to the plane where the touch display panel is positioned, the touch signal line TP may at least partially overlap the data signal line DATA. The common electrode may be reused as the touch electrode 101, and the touch signal line TP is electrically connected to the common electrode COM in the second electrode layer 145 by a via.

As such, the touch signal line TP is arranged in an area that at least partially overlaps the data signal line DATA, so that the proportion of the area with a low light transmittance of the touch display panel decreases, which further improves the aperture ratio of the touch display panel.

Figure 16:
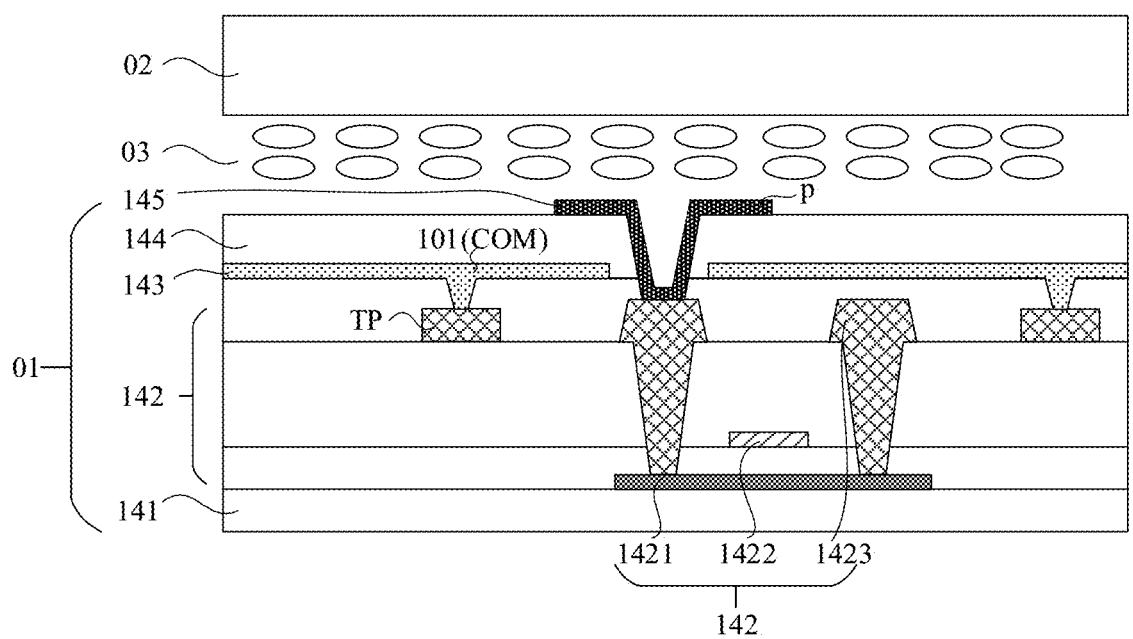
FIG. 16 is another schematic sectional view of a touch display panel according to an embodiment of the present application.

FIG. 16 is another schematic sectional view of a touch display panel according to an embodiment of the present application. As shown in FIG. 16, in another specific example, optionally, the common electrode COM may be arranged in the first electrode layer 143, the pixel electrode p may be arranged in the second electrode layer 145, the common electrode COM may be reused as the touch electrode 101, and the touch signal line TP may be electrically connected to the common electrode COM in the first electrode layer 143 by a via.

The pixel electrode p may receive a pixel voltage signal, and the common electrode COM may receive a constant common voltage signal. The pixel electrode p and the common electrode COM are arranged on a same side of the liquid crystal layer 03 (i.e., in the array substrate 01) to form a fringe field switching (FFS) touch display panel. The common electrode COM may be in a block shape, and one common electrode COM may cover multiple sub-pixels. In a display stage, the common electrode COM receives the common voltage signal and is used as the common electrode. In a touch stage, the common electrode COM receives the touch driving signal and is used as the touch electrode.

The driving device layer 142 may include an active layer 1421, a first metal layer 1422 and a second metal layer 1423 that are stacked, as well as an insulation layer sandwiched between any two adjacent film layers. The first metal layer 1422 may be used for arranging a gate signal line and a gate of a transistor, and the second metal layer 1423 may be used for arranging a source and a drain of the transistor. Specifically, the second metal layer 1423 may be reused as the touch signal line TP.

As such, the first electrode layer 143 is reused as the touch electrode 101, and the second metal layer 1423 is reused as the touch signal line TP, so that the number and the thickness of the film layers of the touch display panel can be reduced, which simplifies the production processes and reduces the production costs.

Figure 17:
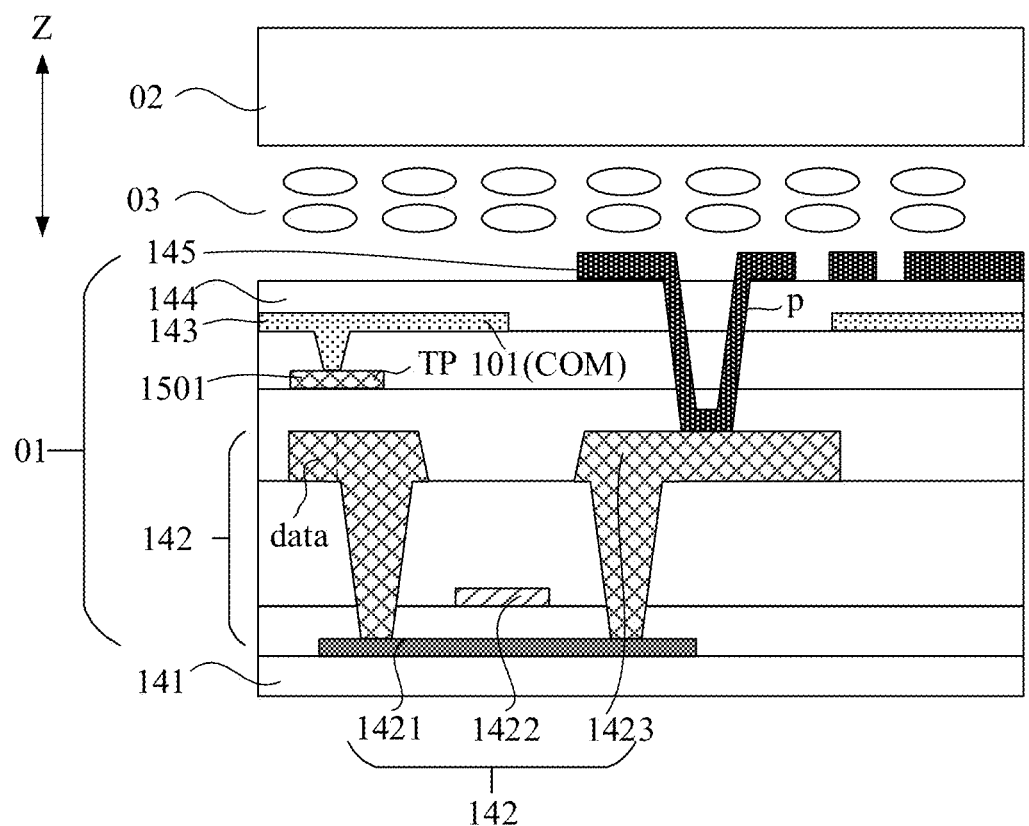
FIG. 17 is another schematic sectional view of a touch display panel according to an embodiment of the present application.

FIG. 17 is another schematic sectional view of a touch display panel according to an embodiment of the present application. As shown in FIG. 17, in contrast to the embodiments shown in FIG. 16, according to still other embodiments of the present application, optionally, the array substrate 01 may further include a target wiring layer 1501. Along the direction Z perpendicular to the plane where the touch display panel is positioned, the target wiring layer 1501 is positioned between the driving device layer 142 and the first electrode layer 143. For example, the target wiring layer 1501 is positioned between the second metal layer 1423 and the first electrode layer 143. Along the direction Z perpendicular to the plane where the touch display panel is positioned, an insulation layer is arranged between the target wiring layer 1501 and the driving device layer 142, and an insulation layer is arranged between the target wiring layer 1501 and the first electrode layer 143. That is, a metal wiring layer (that is, the target wiring layer 1501) is additionally arranged between the driving device layer 142 and the first electrode layer 143.

Optionally, the touch signal line TP may be positioned in the target wiring layer 1501, and along the direction Z perpendicular to the plane where the touch display panel is positioned, the touch signal line TP may overlap (partially or completely) at least one of the source of the transistor, the drain of the transistor and the data signal line DATA in the driving device layer 142. For example, in some specific embodiments, the data signal line DATA, the source and the drain of the transistor may be positioned in the second metal layer 1423, and the data signal line DATA may be electrically connected to the source or the drain of the transistor. Along the direction Z perpendicular to the plane where the touch display panel is positioned, the touch signal line TP may at least partially overlap the data signal line DATA. The common electrode is reused as the touch electrode 101, and the touch signal line TP is electrically connected to the common electrode COM in the first electrode layer 143 by a via.

As such, the touch signal line TP is arranged in an area that at least partially overlaps the data signal line DATA, so that the proportion of the area with a low light transmittance of the touch display panel decreases, which further improves the aperture ratio of the touch display panel.

It should be noted that, although the transistor shown in FIG. 14 to FIG. 17 is of a top gate structure, that is, the gate of the transistor is positioned on a side of an active layer away from the first substrate 141, it can be understood that the transistor in the touch display panel of the embodiments of the present application may also adopt a bottom gate structure, that is, the gate of the transistor is positioned on a side of the active layer facing the first substrate 141 (or to say, the gate of the transistor is positioned below the active layer), which is not limited in the embodiments of the present application.

Figure 18:
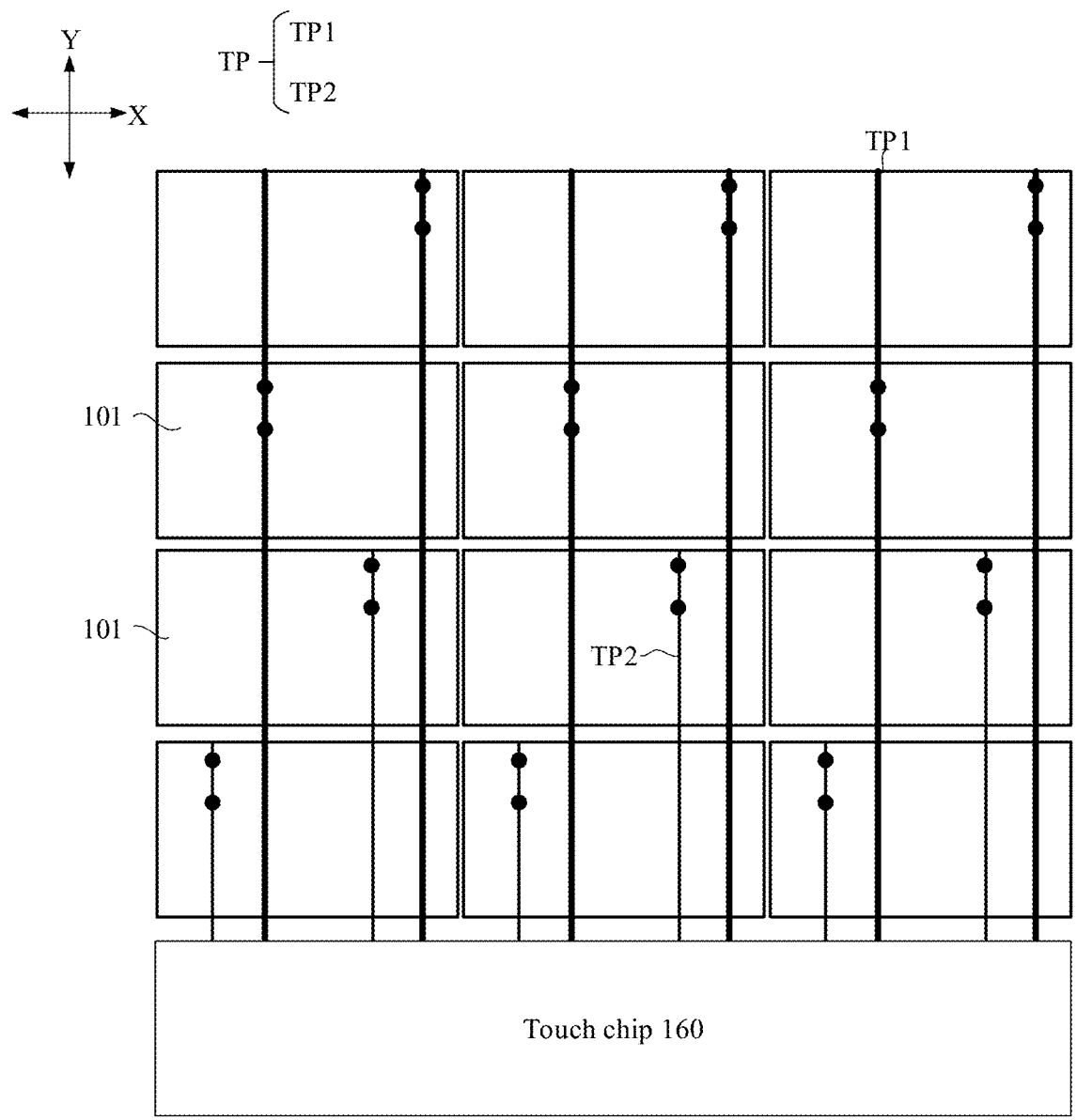
FIG. 18 is another schematic top view of a touch display panel according to an embodiment of the present application.

FIG. 18 is another schematic top view of a touch display panel according to an embodiment of the present application. As shown in FIG. 18, according to some embodiments of the present application, optionally, the touch display panel may specifically be a self-capacitive touch display panel. Specifically, the touch electrodes 101 are electrically connected to the touch signal lines TP in a one-to-one correspondence, and each touch electrode 101 may be connected to a touch chip 160 by a corresponding touch signal line TP The touch signal line TP is configured to transmit a touch driving signal sent by the touch chip 160 to the corresponding touch electrode 101 and transmit a touch sensing signal generated by the corresponding touch electrode 101 back to the touch chip 160.

In some specific examples, the touch chip 160 may be a touch display chip with display and touch functions integrated therein.

Figure 19:
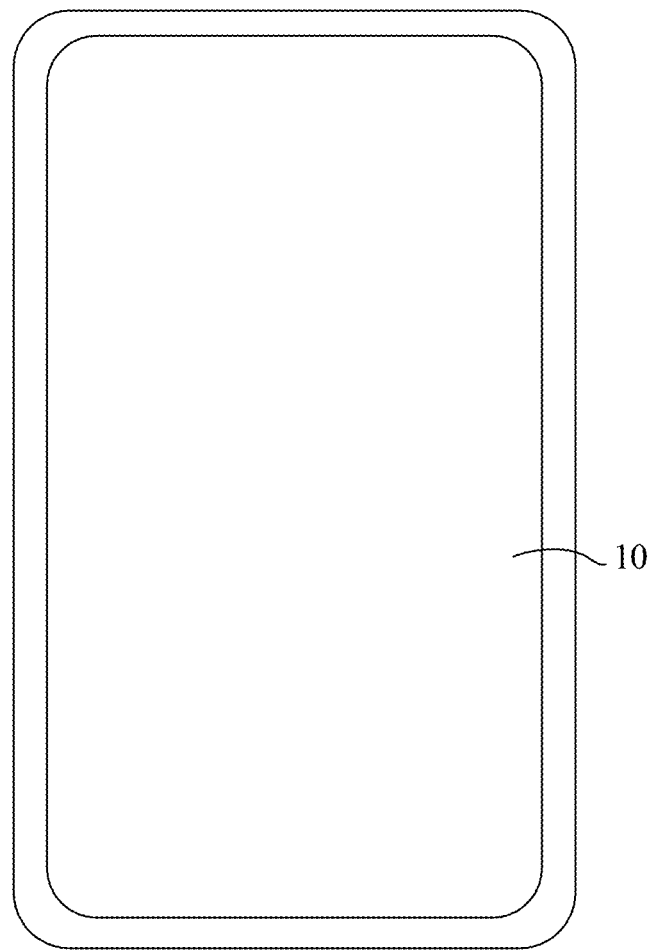
FIG. 19 is a schematic structural view of a touch display device according to an embodiment of the present application.

Based on the touch display panel 10 provided by the above embodiments, correspondingly, the embodiments of the present application further provide a touch display device including the display panel 10 provided by the embodiments of the present application. Reference is made to FIG. 19. FIG. 19 is a schematic structural view of a touch display device according to an embodiment of the present application. A touch display device 1000 provided in FIG. 19 includes the touch display panel 10 provided by any one of the above embodiments of the present application. In an embodiment of FIG. 19, for example, a mobile phone is taken as an example for illustration of the touch display device 1000. It can be understood that, the touch display device provided by the embodiments of the present application may be a wearable product, a computer, a TV, or an onboard touch display device and other touch display devices with display functions, which are not specifically limited in the present application. The touch display device provided by the embodiments of the present application has beneficial effects of the touch display panel 10 provided by the embodiments of the present application. For details, reference can be made to the specific descriptions of the touch display panel 10 in the above embodiments, which are not repeated herein.

It should be understood that, the specific structures of the touch display panel provided in accompanying drawings of the embodiments of the present application are merely some examples, and are not intended to limit the present application. In addition, the above embodiments provided by the present application may be combined with each other without conflict.

The embodiments of the present application as described above do not exhaustively describe all the details, nor do they limit the application to only the specific embodiments described. Obviously, many modifications and variations are possible in light of the above description. The detailed description of these embodiments are for a better explanation of principles and practical applications of the present application, to thereby enable those skilled in the art to best utilize the present application and various embodiments with various modifications. This application is to be limited only by the claims, along with their full scope and equivalents.

It should be noted that, the embodiments in the specification are described in a progressive way, and the same or similar parts between the embodiments may be referred to each other. Each embodiment focuses on the differences from other embodiments. For the embodiments of the display panel and the embodiment of the display device, reference may be made to the description of the embodiments of the pixel driving circuit and the description of the embodiments of the array substrate for related parts. The application is not limited to the specific structures described above and shown in the figures. Various changes, modifications and additions can be made by those skilled in the art after they comprehend the gist of the present application. For the sake of brevity, a detailed description of the known technology is omitted here.

Those skilled in the art should understand that the above-mentioned embodiments are all illustrative and not restrictive. Different technical features appearing in different embodiments can be combined to achieve beneficial effects. Those skilled in the art should be able to understand and implement other modified embodiments of the disclosed embodiments after they study the drawings, the description, and the claims. In the claims, the term "comprising" does not exclude other structures, the term "a" or "an" does not exclude a plurality; the terms "first" and "second" are used to indicate names and not to indicate any particular order. Any reference signs in the claims should not be construed as limiting the protection scope. The presence of certain technical features in different dependent claims does not mean that these technical features cannot be combined to obtain beneficial effects.

What is claimed is:

1. A touch display panel, wherein the touch display panel comprises a first display area, a second display area and a binding area arranged along a first direction, and a touch bonding pad is arranged in the binding area and is configured to input touch driving signals;
   a plurality of touch electrodes are arranged in each of the first display area and the second display area;
   the touch display panel further comprises a plurality of touch signal lines extending along the first direction and arranged at intervals along a second direction, the touch bonding pad is electrically connected to the touch electrodes by the touch signal lines, and the first direction intersects the second direction;
   touch signal lines electrically connected to the touch electrodes in the first display area are first touch signal lines, touch signal lines electrically connected to the touch electrodes in the second display area are second touch signal lines, and a minimum width of each of the second touch signal lines along the second direction is less than a minimum width of each of the first touch signal lines along the second direction;
   the touch display panel further comprises black matrixes;
   each of the first display area and the second display area comprises a plurality of pixel units arranged along the second direction, and each of the pixel units comprises a plurality of sub-pixels separated by the black matrixes along the second direction;

along a direction perpendicular to a plane where the touch display panel is positioned, each of the touch signal lines at least partially overlaps at least one of the black matrixes;

each of the pixel units comprises a first color sub-pixel, a second color sub-pixel and a third color sub-pixel arranged at intervals along the second direction;

along the second direction, a width of a black matrix adjacent to the first color sub-pixel, a width of a black matrix adjacent to the second color sub-pixel and a width of a black matrix adjacent to the third color sub-pixel are different from one another; and each of the pixel units corresponds to one of the first touch signal lines and one of the second touch signal lines, along the direction perpendicular to the plane where the touch display panel is positioned, the first touch signal line at least partially overlaps a widest black matrix among the black matrix adjacent to the first color sub-pixel, the black matrix adjacent to the second color sub-pixel and the black matrix adjacent to the third color sub-pixel, and the second touch signal line at least partially overlaps a second widest black matrix among the black matrix adjacent to the first color sub-pixel, the black matrix adjacent to the second color sub-pixel and the black matrix adjacent to the third color sub-pixel;

along the second direction, a distance between a center point of the first color sub-pixel and a center point of the second color sub-pixel is a first distance, and a distance between the center point of the second color sub-pixel and a center point of the third color sub-pixel is a second distance, wherein the second distance is not equal to the first distance, and a pixel opening of the first color sub-pixel, a pixel opening of the second color sub-pixel and a pixel opening of the third color sub-pixel are of a same size; or the second distance is equal to the first distance, and a pixel opening of the first color sub-pixel, a pixel opening of the second color sub-pixel and a pixel opening of the third color sub-pixel are of different sizes; and along the direction perpendicular to the plane where the touch display panel is positioned, the widest black matrix completely covers the first touch signal line, and the second widest black matrix completely covers the second touch signal line.

2. The touch display panel according to claim 1, wherein each of the pixel units corresponds to two of the plurality of touch signal lines, each of the two touch signal lines is arranged between sub-pixels of the pixel unit along the second direction, and the sub-pixels between which one of the two touch signal lines is arranged are at least partially different from the sub-pixels between which the other of the two touch signal lines is arranged;

one of the two touch signal lines is one of the first touch signal lines, and the other of the two touch signal lines is one of the second touch signal lines.

3. The touch display panel according to claim 2, wherein the second touch signal lines and the touch electrodes are positioned in different film layers, and the second touch signal lines, after being electrically connected to the touch electrodes by first vias, terminate along the first direction.

4. The touch display panel according to claim 2, wherein the second touch signal lines and the touch electrodes are positioned in different film layers, and the second touch signal lines, after being electrically connected to the touch electrodes by first vias, extend to and terminate at an edge of the second display area close to the first display area.

5. The touch display panel according to claim 3, wherein the touch display panel further comprises dummy touch signal lines electrically connected to the touch electrodes;

each of the second touch signal lines corresponds to at least one of the dummy touch signal lines;

along the first direction, the at least one dummy touch signal line corresponding to the second touch signal line is positioned on a side of the second touch signal line away from the binding area; and along a direction perpendicular to a plane where the touch display panel is positioned, each of the dummy touch signal lines at least partially overlaps at least one of the touch electrodes.

6. The touch display panel according to claim 4, wherein the touch display panel further comprises dummy touch signal lines electrically connected to the touch electrodes;

each of the second touch signal lines corresponds to at least one of the dummy touch signal lines;

along the first direction, the at least one dummy touch signal line corresponding to the second touch signal line is positioned on a side of the second touch signal line away from the binding area; and along a direction perpendicular to a plane where the touch display panel is positioned, each of the dummy touch signal lines at least partially overlaps at least one of the touch electrodes.

7. The touch display panel according to claim 1, wherein the second touch signal lines and the touch electrodes are positioned in different film layers, and the second touch signal lines, after being electrically connected to the touch electrodes by first vias, extend to and terminate at the first display area.

8. The touch display panel according to claim 7, wherein a minimum length of each of the second touch signal lines along the first direction is the same as a minimum length of each of the first touch signal lines along the first direction.

9. The touch display panel according to claim 1, wherein along the second direction, a width of a black matrix between the third color sub-pixel and a first color sub-pixel in an adjacent pixel unit is a first width, a width of a black matrix between the third color sub-pixel and the second color sub-pixel is a second width and a width of a black matrix between the second color sub-pixel and the first color sub-pixel is a third width;

the first width>the second width>the third width, or the second width>the first width>the third width, or the first width>the third width>the second width; and the first color sub-pixel comprises a red sub-pixel, the second color sub-pixel comprises a green sub-pixel and the third color sub-pixel comprises a blue sub-pixel.

10. The touch display panel according to claim 1, wherein the touch display panel comprises an array substrate, a color filter substrate, and a liquid crystal layer sandwiched between the array substrate and the color filter substrate;

the array substrate comprises a first substrate, a driving device layer, a first electrode layer, a first insulation layer and a second electrode layer that are stacked, and the second electrode layer is positioned on a side of the first electrode layer close to the liquid crystal layer; and the touch signal lines are positioned in the driving device layer, and the touch electrodes are positioned in the first electrode layer or the second electrode layer.

11. The touch display panel according to claim 1, wherein the touch display panel comprises an array substrate, a color filter substrate, and a liquid crystal layer sandwiched between the array substrate and the color filter substrate;

the array substrate comprises a first substrate, a driving device layer, a target wiring layer, a first electrode layer, a first insulation layer and a second electrode layer that are stacked, and the second electrode layer is positioned on a side of the first electrode layer close to the liquid crystal layer; and the touch signal lines are positioned in the target wiring layer, and the touch electrodes are positioned in the first electrode layer or the second electrode layer.

12. The touch display panel according to claim 10, wherein a pixel electrode is arranged in the first electrode layer, a common electrode is arranged in the second electrode layer, the common electrode is reused as the touch electrode, and the touch signal lines are electrically connected to the common electrode in the second electrode layer by vias.

13. The touch display panel according to claim 10, wherein a common electrode is arranged in the first electrode layer, a pixel electrode is arranged in the second electrode layer, the common electrode is reused as the touch electrode, and the touch signal lines are electrically connected to the common electrode in the first electrode layer through vias.

14. The touch display panel according to claim 11, wherein a source and a drain of a transistor are arranged in the driving device layer, and the touch display panel further comprises a data signal line positioned on a same layer as the source and the drain of the transistor; and along a direction perpendicular to a plane where the touch display panel is positioned, each of the touch signal lines overlaps at least one of the source of the transistor, the drain of the transistor and the data signal line in the driving device layer.

15. The touch display panel according to claim 1, wherein the touch electrodes are electrically connected to the touch signal lines in a one-to-one correspondence, each of the touch electrodes is connected to a touch chip by a corresponding one of the touch signal lines, and each of the touch signal lines is configured to send a touch driving signal sent by the touch chip to a corresponding one of the touch electrodes and transmit a touch sensing signal generated by the corresponding one of the touch electrodes back to the touch chip.

16. A touch display device, comprising the touch display panel according to claim 1.

\* \* \* \* \*